US009968881B2

(12) United States Patent
Hedin et al.

(10) Patent No.: US 9,968,881 B2
(45) Date of Patent: May 15, 2018

(54) MAGNETIC ACTIVATED CARBON AND METHODS FOR PREPARING AND REGENERATING SUCH MATERIALS

(71) Applicant: BIOKOL LILLIESTRALE & CO KB, Stockholm (SE)

(72) Inventors: Niklas Hedin, Stockholm (SE); Malte Lilliestrale, Stockholm (SE); Hao Wenming, Stockholm (SE); Eva Bjorkman, Trosa (SE)

(73) Assignee: BIOKOL LILLIESTRÂLE & CO KB, Stockholm (SE)

( * ) Notice: Subject to any disclaimer, the term of this patent is extended or adjusted under 35 U.S.C. 154(b) by 508 days.

(21) Appl. No.: 14/421,949

(22) PCT Filed: Aug. 16, 2013

(86) PCT No.: PCT/SE2013/050976
§ 371 (c)(1),
(2) Date: Feb. 16, 2015

(87) PCT Pub. No.: WO2014/027953
PCT Pub. Date: Feb. 20, 2014

(65) Prior Publication Data
US 2015/0217222 A1    Aug. 6, 2015

(30) Foreign Application Priority Data

Aug. 17, 2012    (SE) ..................... 1250931

(51) Int. Cl.
| C01B 31/08 | (2006.01) |
| B01D 53/04 | (2006.01) |
| B01J 20/20 | (2006.01) |
| B01J 20/06 | (2006.01) |
| B01J 20/28 | (2006.01) |
| B01J 20/30 | (2006.01) |
| B01J 20/34 | (2006.01) |
| B82Y 30/00 | (2011.01) |
| H01F 1/00 | (2006.01) |
| B01J 8/00 | (2006.01) |
| B01J 8/02 | (2006.01) |
| B01D 15/08 | (2006.01) |
| C01B 32/336 | (2017.01) |

(52) U.S. Cl.
CPC ............. *B01D 53/04* (2013.01); *B01D 15/08* (2013.01); *B01J 8/009* (2013.01); *B01J 8/0085* (2013.01); *B01J 8/025* (2013.01); *B01J 20/06* (2013.01); *B01J 20/20* (2013.01); *B01J 20/28007* (2013.01); *B01J 20/28009* (2013.01); *B01J 20/28026* (2013.01); *B01J 20/28057* (2013.01); *B01J 20/28061* (2013.01); *B01J 20/28064* (2013.01); *B01J 20/28069* (2013.01); *B01J 20/28073* (2013.01); *B01J 20/3078* (2013.01); *B01J 20/3085* (2013.01); *B01J 20/3416* (2013.01); *B01J 20/3441* (2013.01); *B82Y 30/00* (2013.01); *C01B 32/336* (2017.08); *H01F 1/0063* (2013.01); *B01D 2253/102* (2013.01); *B01D 2253/30* (2013.01); *B01D 2259/40088* (2013.01); *B01J 2208/00168* (2013.01); *B01J 2208/00407* (2013.01); *B01J 2208/00415* (2013.01); *B01J 2208/00522* (2013.01); *B01J 2220/485* (2013.01); *B01J 2220/4825* (2013.01); *B01J 2220/4843* (2013.01); *Y02C 10/08* (2013.01)

(58) Field of Classification Search
CPC ............................. B01J 20/20; C01B 32/336
See application file for complete search history.

(56) References Cited

U.S. PATENT DOCUMENTS

| 7,429,330 B2 | 9/2008 | Vo et al. |
| 7,879,136 B2 | 2/2011 | Mazyck |
| 8,097,185 B2 | 1/2012 | Miller et al. |
| 2004/0147397 A1 | 7/2004 | Miller et al. |
| 2010/0155335 A1 | 6/2010 | Taboada-Serrano et al. |

(Continued)

FOREIGN PATENT DOCUMENTS

| CN | 1765494 | 5/2006 |
| CN | 101642699 | 2/2010 |
| CN | 101811692 | 8/2010 |

(Continued)

OTHER PUBLICATIONS

Second Chinese Office Action for Chinese Application No. CN 201380050153.0, English translation attached to original, Both completed by the Chinese Patent Office, dated Sep. 30, 2016, All together 23 Pages.
Third Chinese Office Action for Chinese Application No. CN 201380050153.0, English translation attached to original, Both completed by the Chinese Patent Office, dated Mar. 22, 2017, All together 37 Pages.
Japanese Search Report for Japanese Application No. JP 2015-527426, English translation attached to original, Both completed by the Japanese Patent Office, dated Feb. 17, 2017, All together 46 Pages.

(Continued)

*Primary Examiner* — Stuart Hendrickson
(74) *Attorney, Agent, or Firm* — Brooks Kushman P.C.

(57) ABSTRACT

A process for preparing magnetic activated carbons including the steps of a) treating an aqueous solution having a biomass hydrothermally at autogenic pressure at a temperature 180 and 250° C., under acidic conditions in the presence of iron ions, to obtain a precursor product, b) activating the precursor product obtained in step a) by mixing an activating agent at elevated temperatures between 550 and 850° C., for a period up to 9h. The disclosure also relates to magnetic activated carbon prepared according to the process and use of the carbon for separation and storage of gases and purification of liquids. A method for separation of particles from a liquid and/or a gas, and method for regenerating magnetic activated carbon by heating using an oscillating electromagnetic field are also disclosed.

9 Claims, 15 Drawing Sheets

(56) References Cited

U.S. PATENT DOCUMENTS

2010/0196246 A1    8/2010    Zhang et al.
2012/0048111 A1    3/2012    Nakao et al.

FOREIGN PATENT DOCUMENTS

| | | |
|---|---|---|
| CN | 101847481 | 9/2010 |
| CN | 101948106 | 1/2011 |
| CN | 102110506 | 6/2011 |
| CN | 102225792 | 10/2011 |
| EP | 1491256 | 12/2004 |
| JP | S5462188 | 5/1979 |
| JP | S5489994 | 7/1979 |
| JP | H09241014 | 9/1997 |
| JP | 2004161574 | 6/2004 |
| JP | 2007022840 | 2/2007 |
| JP | 2007153684 | 6/2007 |
| WO | 02069351 | 9/2002 |
| WO | 2009127887 | 10/2009 |

OTHER PUBLICATIONS

Japanese Office Action for Japanese Application No. JP 2015-527426, English translation attached to original, Both completed by the Japanese Patent Office, dated Feb. 28, 2017, All together 14 Pages.

Extended European Search Report for European Application No. EP 13829545.6, Completed by the European Patent Office, dated May 4, 2016, 11 Pages.

Chinese Office Action for Chinese Application No. CN 201380050153.0, Completed by the Chinese Patent Office, dated Feb. 14, 2016, 31 Pages.

Hines et al. LANGMUIR, vol. 20, No. 8, Mar. 16, 2004, pp. 3388-3397, XP055084543, ISSN 0743-7463, DOI 10.1021 1a0360613, "Surface Properties of Porous Carbon Obtained from Polystyrene Sulfonic Acid Based Organic Salts".

Wu et al. Environmental Pollution and Control, vol. 34, No. 7, English Abstract attached to original document, All together 8 Pages, Jul. 2012, "Progress on hydrothermal carbonization of waste biomass".

Liu, Chinese Masters Theses Full text Database Engineering Science and Technology II, English Abstract attached to original Document, All together 11 Pages, published on Aug. 16, 2011 to Sep. 15, 2011, "Preparation and Capacitance Characterization of Carbon Electrode Materials".

International Search Report for PCT/SE2013/050976, Completed by the Swedish Patent Office dated Jan. 15, 2014, 8 Pages.

Fuertes et al. Chem. Mater. 2006, vol. 18, p. 1675-1679, "A Facile Route for the Preparation of Superparamagnetic Porous Carbons."

Schwickardi et al. Chem. Commun. 2006, p. 3987-3989, "Scalable synthesis of activated carbon with superparamagnetic properties."

Titirici et al. Chem. Soc. Rev. 2010, vol. 39, p. 103-116, "Chemistry and materials options of sustainable carbon materials made by hydrothermal carbonization."

Baccile et al. J. Phys. Chem. C 2009, vol. 113, p. 9644-9654, "Structural Characterization of Hydrothermal Carbon Spheres by Advanced Solid-State MAS 13C NMR Investigations."

Baccile et al. The Journal of Physical Chemistry 2011, vol. 115, p. 8976-8982, "Structural Insights on Nitrogen-Containing Hydrothermal Carbon Using Solid-State Magic Angle Spinning 13C and 15N Nuclear Magnetic Resonance."

Sevilla et al. Energy Environ. Sci. 2011, vol. 4, p. 1765-1771, "Sustainable porous carbons with a superior performance for CO2 capture."

Liu et al. Desalination 2011, vol. 267, p. 101-106, "Removal of Copper (II) ad phenol from aqueous solution using porous carbons derived from hydrothermal chars."

Erdenetsogt et al. International Journal of Coal Geology 2010, vol. 82, p. 37-44, "Solid-state C-13 CP/MAS NMR study of Baganuur coal, Mongolia: Oxygen-loss during coalification from lignite to subbituminous rank."

Chen et al. Bioresource Technology 2011, vol. 102, p. 716-723, "A novel magnetic biochar efficently sorbs organic pullutants and phosphate."

Cherbanski et al. Chemical Engineering and Processing 2009, vol. 48, p. 48-58, "Intensification of desorption processes by use of microwaves—An overview of possible applications and industrial perspectives."

Cui et al. Small 2006, vol. 2, No. 6, p. 756-759, "Structural Effects of Iron Oxide Nanoparticles and Iron Ions on the Hydrothermal Carbonization of Starch and Rice Carbohydrates."

Jia et al. BioResources 2010, vol. 5, No. 4, p. 2248-2257, "Preparation of Microwave Absorbing Nickel-Based Activated Carbon by Electroless Plating with Palladium-Free Activation."

Liu et al. Chemical Engineering Journal 2010, vol. 160, p. 57-62, "Arsenate removal from water using Fe3O4-loaded activated carbon prepared from waste biomass."

Lv et al. Journal of Hazardous Materials 2009, vol. 171, p. 634-639, "Rice hull/MnFe2O4 composite: Preparation, characterizaion and its rapid microwave-assisted COD removal for organic wastewater."

Mohan et al. Chemical Engineering Journal 2011, vol. 172, p. 1111-1125, "Development of magnetic activated carbon from almond shells for trinitrophenol removal from water."

Oliveira et al. Journal of Hazardous Materials 2009, vol. 165, p. 87-94, "Preparation of activated carbons from coffee husks utilizing FeCl3 and ZnCl2 as activating agents."

Zadrazil et al. Chemical Engineering Science 2013, vol. 101, p. 382-389, "Remote control of desorption by radiofrequency heating: Single pellet experiments."

Jia et al. Materials Science and Engineering B 2011, vol. 176, pp. 861-865, "Preparation and application of novel magnetically separable y-Fe2O3/activated carbon sphere adsorbent".

MAGNETIC ACTIVATED CARBON AND METHODS FOR PREPARING AND REGENERATING SUCH MATERIALS

CROSS-REFERENCE TO RELATED APPLICATION

This application is the U.S. national phase of PCT Application No. PCT/SE2013/050976 filed on Aug. 16, 2013, which claims priority to SE Patent Application No. 1250931-1 filed on Aug. 17, 2012, the disclosures of which are incorporated in their entirety by reference herein.

THE FIELD OF THE INVENTION

The present invention refers to a process for preparing magnetic activated carbons according to claim 1 and to magnetic activated carbons as well as a use of said magnetic activated carbons. The invention further relates to a method for separation of particles from a liquid and/or a gas, and a method for regenerating magnetic activated carbon.

BACKGROUND OF THE INVENTION AND PRIOR ART

Activated carbon with magnetic properties has the advantage of being easily separable from a system. The idea to precipitate or crystallize a magnetic component into the porous network of an already activated carbon is straightforward and has been successfully applied. Incorporating iron components together with a precursor during the synthesis is the preferable procedure to obtain a functional and magnetic activated carbon. However, such incorporation reduces the surface area and pore volume of the activated carbon, and the magnetic component is only loosely integrated and may leach.

Hydrothermal carbonization can provide an effective process for introducing nanosized iron components into carbonized material. Hydrothermally carbonized (HTC) biomass is a stable organic material with many prospective applications. Its associated carbonization process has high carbon efficiency, it is exothermic, and it has minor associated release of greenhouse gases. Baccile et al. determined the molecular nature of HTC glucose by carbonizing glucose that was enriched in $^{13}C$ and studied the product with multidimensional solid-state Nuclear Magnetic Resonance (NMR) spectroscopy.[9] From such data they concluded that HTC biomass was on an average consisting of a heavily cross-linked polymer with mainly furanic moieties. Recently they showed that when nitrogen was present in the organic raw material, it was included in the cross-linked HTC biomass.[10]

Activation of regular biomass into activated carbon can be performed physically or chemically. Physical activation is typically performed by treating various carbonaceous matter with air, carbon dioxide or steam at high temperature. Chemical activation is performed at elevated temperatures with addition of compounds such as KOH, $ZnCl$ and $H_3PO_4$. Sevilla et al. chemically activated HTC biomass produced from *eucalyptus* sawdust with KOH at a temperature of 800° C.[12] Liu et al. activated HTC biomass prepared from pinewood sawdust and rice husk with carbon dioxide and reached specific surface areas of 569 $m^2/g$.[13]

Waste biomasses often have environmental problems. Composting of horse manure releases climate gases and does not fully destroy pharmaceutical residues and pathogens that may leach into the environment. Grass cuttings releases both nitrous oxide and methane to the atmosphere, which both are greenhouse gases. Waste from beer production has a low economic value and is mainly used as animal food. Biosludge can seldom directly be used as fertilizer and those from pulp and paper mills have insignificant commercial values.

U.S. Pat. Nos. 7,429,330 and 7,879,136 disclose a process for preparing magnetic activated carbon by adding solid-based iron oxide to a coal/pitch mixture, and compacting it before carbonization, followed by activation into activated carbon according to existing activation processes.

US2010/0155335 discloses a process for preparing magnetic activated carbon by mixing already activated carbon with an iron solution, which has an +2 or +3 form, and followed by increasing the pH to let iron oxide precipitated in the pores of activated carbon.

US2004/0147397 discloses a process, whereby magnetic activated carbons are prepared in a traditional two step method of carbonization and activation. Soluble iron is introduced into the carbon prior to carbonization by soaking the carbon precursors into a solution of the magnetic material precursor.

U.S. Pat. No. 8,097,185 discloses a process for preparing magnetic activated carbon, whereby a carbon precursor of soft wood is soaked in a solution of a ferric salt, dried, pyrolized and activated.

There is still a need for a more efficient and cost effective process for the preparation of active carbons. There is also a need for improved magnetic activated carbon products. There are economic and environmental advantages to be able to use ubiquous and low cost biowaste biomass.

SUMMARY OF THE INVENTION

The object of the present invention is to provide an effective process for introducing a magnetic nanosized iron component into activated carbonized material. A further object is to provide a carbonization process with high carbon efficiency and utilizing common available categories of soft and wet biomass as raw material.

The object is achieved by the process according to claim 1 for preparing magnetic activated carbons comprising the steps of
a) treating an aqueous solution comprising a biomass hydrothermally at autogenic pressure at a temperature between 180 and 250° C., under acidic conditions, in the presence of iron ions, to obtain a precursor product, and
b) activating the precursor product obtained in step a) by mixing an activating agent at, elevated temperatures between 550 and 850° C., for a period up to 9 h.

The first step of the process for preparing a composite of an activated carbon with integrated nanoparticles of a magnetic phase, according to the invention, is carbonization of the raw material. This step is preferably performed in water at elevated temperature and pressure. The process is exothermic and has a small carbon loss. It starts with dehydration and fragmentation reactions on the original biomass, which are followed by condensation and polymerization reactions to provide the cross-linked coal-like precursor product (HTC biomass). The elevated pressure increases the value of the water ionization constant and thereby the concentration of hydrogen and hydroxide ions, which in turn facilitates the carbonization reactions. Iron ions are encapsulated within the carbon structures.

Another advantage is that the process can be used to provide an activated carbon product from various types of categories of soft and wet biomasses. The release of environmental unfriendly gases is minimized using the new process. This means that biomasses can be used, which previously could not be used for environmental, economic and/or technical reasons. Some examples of biomasses are horse manure, waste from beer production, grass cuttings and biosludge.

In one embodiment, the process comprises a further step of extracting the hydrothermally carbonized biomass before activation, with an organic solvent selected from an alkanol, alkylester or alkanon. In yet another embodiment, the alkanon is acetone, ethanol or methanol.

An extraction process may be used for removing a liquid phase from the precursor material in order to improve the subsequent activation process. Further, the organic soluble compounds may be recycled.

In another embodiment, the activating agent is mixed at elevated temperatures between 700 and 800° C., for a period between 2 and 8 h.

In a further embodiment, the activating agent is a gas or a vapour selected from the group comprising $CO_2$, dilute $O_2$ and/or inert gas. In yet another embodiment, the gas or a vapour is $N_2$ or $H_2O$.

In one embodiment, the flow rate of the gas or vapour is between 5 and 75 $dm^3/h$.

In another embodiment, the flow rate is between 5 and 75 $dm^3/h$ at atmospheric pressure, per 5 gram of precursor material.

The flow rate depends, among others, on the amount of biogass used in the process.

In one embodiment, the iron used is an iron salt or alloy comprising $Fe^{2+}$ and/or $Fe^{3+}$.

An advantage of a salt such as for example $FeSO_4$ salt is that this salt is readily available and economically attractive to use.

In another embodiment, the biomass is selected from the group comprising grass cutting, biowaste from beer production, horse manure, bio-sludge, carbohydrates, modified carbohydrates, algae, sea weed, bagasse, fish waste, mammal manure, or mixtures thereof. In yet another embodiment, the biomass is selected from the group comprising grass cutting, bio waste from fermentation and composting processes, modified carbohydrates, municipal and industrial bio sludge, amino polysaccharides, spilling from ungulates, algae, sea weed, water hyacinth and bagasse, or mixtures thereof. Examples of amino polysaccharides may be chitin in fungi and exoskeletons of arthropods. Spilling from ungulates may be horse manure.

An advantage of the process according to the present invention is that the hydrothermal treatment of biomass has a very negligible carbon foot print. Current technologies for carbonization give significant releases of $CO_2$. The new process reduces $CO_2$ released from the processed biomasses.

Yet another object is to provide magnetic activated carbons, whereby the outer shape of the biomass particles remains largely unaffected.

Another object is to provide a hydrothermally carbonized (HTC) biomass, as a stable organic material with many prospective applications. A further object is to provide an HTC biomass from different waste biomasses, which have been activated into magnetic activated carbons with specific surface areas up to about 1000 $m^2/g$ with excellent yields. It is a further object to provide magnetic activated carbons with improved stability.

These objects are achieved by magnetic activated carbons prepared according to the process described above.

These objects are also achieved by magnetic activated carbons obtained from a biomass, characterized in comprising a surface area between 250 and 1000 $m^2/g$, a total pore volume between 0.250 and 1.0 $cm^3/g$, a micropore volume between 0.050 and 0.30 $cm^3/g$, and an iron content between 2 and 10 wt. % of the weight of the magnetic activated carbon, and further comprising crystallized iron oxide nanoparticles having a diameter that is larger than the size of the pores in the carbonized biomass.

The product obtained by the process is a magnetic activated carbon with tuneable surface areas and pore volume, with a significant/sufficient magnetization, because of the well developed and nanometer sized iron oxide particles. The magnetic activated carbon composite particles can be moved by the gradients of an external magnetic field, and can be heated by an oscillating electromagnetic field in the microwave frequency bands, e.g. between 30 KHz and 3 MHz.

One advantage of the new activated carbon composite is that it comprises magnetized nanoparticles of iron oxide. The carbon composite particles can be moved by applying an external magnetic field. Such particles can thus be separated from liquids. Current technology, such filtering, sedimentation, for the separation of the nanoparticles are thus not needed. Magnetic nanoparticles can be heated by the use of electromagnetic field operating in the radio or microwave frequency domain. Such heating can reduce the swing cycle time in a temperature swing adsorption process. When the magnetic activated carbon is embedded a liquid or a solid material, such as oils, paint and various building material, heat can be provided by applying an oscillating electromagnetic field for heating the iron particles embedded in the magnetic activated carbon. This reduction of cycle time has the advantage of increasing the through put in a given gas separation device. In one embodiment, the diameter of the iron oxide nanoparticles is between 10 and 50 nm. In a further embodiment, the diameter of the iron oxide nanoparticles is between 20 and 40 nm.

The invention provides a stable bed of magnetic activated carbons, whereby nanoparticles are stably dispersed in the activated carbon material.

In another embodiment, the surface area is between 600 and 1000 $m^2/g$ and the total pore volume is between 0.50 and 1.0 $cm^3/g$.

The invention provides a method to produce magnetic activated carbons with high surface area and large pore volume.

In one embodiment, the biomass is selected from the group comprising grass cutting, bio waste from fermentation and composting processes, modified carbohydrates, municipal and industrial bio sludge, amino polysaccharides, spilling from ungulates, algae, sea weed, water hyacinth and bagasse, or mixtures thereof. In another embodiment, the biomass is selected from the group comprising grass cutting, biowaste from beer production, horse manure, bio-sludge, carbohydrates, modified carbohydrates, algae, sea weed, bagasse, fish waste, mammal manure, or mixtures thereof.

The more effective and efficient process according to the invention provides an improved product. This reduces costs related to preparation processes and use of magnetic activated carbon products.

The invention also relates to a use of magnetic activated carbon for separation and storage of gases, purification of liquids, removing pharmaceutical residues from sewage residue water and drinking water, heterogen catalyses support, aquariums and industrial fish farms, industrial water, decaffeination processes, chemical spill clean-up, electromagnetic heated composite in oils, liquids, paint, pipes and building materials, decolourization, odor removal, purification of nitrogen and methane, cleaning electrodes in fuel cells, supercapitors and batteries. Another embodiment relates to the use for separation of gases, purification of gases, purification of liquids such as water, medical application, aquarium pumps, industrial water treatment, decaffeination processes, sewage treatment, chemical spill clean-up, decolourization, odour removal, support for catalysts, nitrogen purification, oxygen purification, biogas upgrading, natural gas upgrading, fuel cells and/or electrode materials in batteries and supercapacitors.

The invention further relates to a method for separation of particles from a liquid and/or a gas comprising the following steps;

step 1) providing the magnetic activated carbon as defined above, in a container adapted to hold a liquid and/or a gas, step 2) contacting the liquid and/or gas with said magnetic activated carbon in said container to purify the liquid and/or gas from particles, step 3) applying an electromagnetic field to said container in order to separate said magnetic activated carbon from the liquid and/or gas, step 4) removing the liquid and/or gas from the container, step 5) ceasing the electromagnetic field, and optionally, step 6) filling the container with a new liquid and/or gas that needs to be purified and repeating step 3) to 5), and further optionally step 7) upgrading or destroying the magnetic activated carbon.

In one embodiment, the container is a pipe.

The invention relates to a method for regenerating magnetic activated carbon comprising applying an oscillating electromagnetic field for heating the iron particles embedded in the carbon composite. This procedure facilitates desorption of gas at a pressure.

One embodiment of the invention related to a method for heating a liquid or a solid that comprises magnetic activated carbon, whereby the method comprises applying an oscillating electromagnetic field for heating the iron particles embedded in the magnetic activated carbon. In one embodiment, the liquid is paint or oil. In another embodiment the solid is building material comprising various composite materials, such as concrete.

In another embodiment of the method for regenerating, an oscillating electromagnetic field is applied at a frequency between 30 KHz and 3 MHz.

BRIEF DESCRIPTION OF THE DRAWINGS

The present invention is now to be explained more closely by means of embodiments, which are disclosed as examples, and with reference to the attached drawings.

DETAILED DESCRIPTION OF VARIOUS EMBODIMENTS OF THE INVENTION

Figure 1A:
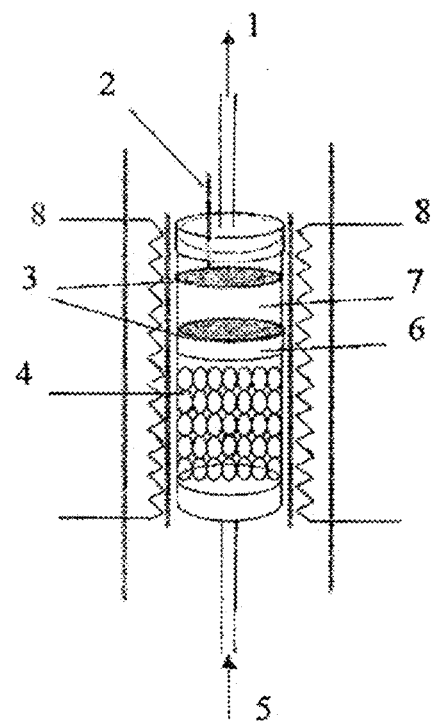
FIGS. 1A, 1B show a reactor used for activating hydrothermally carbonized (HTC) biomass.

Biomasses or biowastes used in a process according to the invention have different origins. The origin of the biomass is not crucial for the invention. Examples of biomass material are grass cutting, bio waste from fermentation and composting processes, modified carbohydrates such as saccharides, municipal and industrial bio sludge, amino polysaccharides such as chitin in fungi and exoskeletons of arthropods, spilling from ungulates such as horse manure, algae, sea weed, water hyacinth and bagasse. Preferred biomasses are grass cutting and horse manure. Other preferred biomasses are biowaste from beer production and bio-sludge. Mixtures of biomasses may be used as well.

Normally, the biomass used in the process is first cut into smaller pieces, the size of which depends on the scale of the production and the type of reactor used.

In step a) of the process water or another aqueous liquid, an organic acid together with small amounts of an iron salt, are added to the biomass and mixed.

Examples of organic acids may be citric acid, acetic acid, lactic acid, formic acid, oxalic acid and uric acid, or mixtures thereof.

The pH value of the mixture after addition of the organic acid may be between 3 and 6, or between 4 and 5.

The iron used is $Fe^{2+}$ and/or $Fe^{3+}$ and may originate from any iron salt or alloy. One example may be $FeSO_4$.

The temperature in step a) may be between 180 and 300° C. In one embodiment, the temperature is between 1:80 and 230° C.

The pressure in the reactor can be between 1.5 and 2.5 MPa.

After 1 to 3 hours, the biomass and water can be pumped into a larger vessel. The obtained product may than be equilibrated for some hours (e.g. 4 to 7 hours, or 5 to 6 hours) at a temperature between 25 and 80° C. After equilibration the precursor product may be cooled and filtered.

The amount of iron in the precursor may be between 1 and 3 wt %, or between 0.5 and 5 wt % of the total weight of the mixture.

An extraction step may be optionally performed after the hydrothermal carbonization in step a).

The extraction may be performed using an organic solvents or a mixture of organic solvents. Examples of organic solvents may be alkanols, alkanons, esters and the like. Preferably, lower ($C_1$ to $C_4$)alkyl chains are used. Specific examples are acetone, methanol, ethanol, propanol, butanol, butanone, butyl alcohol, carbon tetrachloride, chlorobenzene, chloroform, cyclohexane, 1,2-dichloroethane, diethyl ether, diethylene glycol, diglyme(diethylene glycol dimethyl ether), 1,2-dimethoxy-ethane, dimethylether, dimethyl-formamide, dimethyl sulfoxide, dioxane, ethyl acetate, ethylene glycol, glycerin, heptane, hexane, methyl t-butyl ether, methylene chloride, N-methyl-2-pyrrolidinone, pentane, petroleum ether, pyridine tetrahydrofuran, toluene, acetonitrile, benzene, and so on. A preferred organic solvent may be acetone. Another preferred solvent may be ethanol or methanol.

In step b) the precursor product obtained in step a) may be mixed with an activated agent.

The activating agent may be a gas or a vapour selected from the group comprising $CO_2$, dilute $O_2$ and/or an inert gas. The gas or vapour may be $N_2$ or $H_2O$.

The flow rate of the gas or vapour may be between 5 and 75 dm³/h, or between 10 and 60 dm³/h. In one embodiment, the flow rate is between 15 and 50 dm³/h.

The amount of $O_2$ gas may be kept at a minimum in order to prevent combustion. The amount of $O_2$ is preferably less than 100 ppm.

The temperature in the reactor is preferably stepwise increased in step b), for example, at a rate of 5 to 15° C., or 10° C. per minute. Activation may be performed at a temperature between 550 and 850° C. In one embodiment, the activation temperature is between 650 and 825° C.

The activation period in step b) depends on varies process factors such as the scale of the production, the type of reactors used and the type of biomass material. The period may be up to 10 hours, or between 1 and 9, or between 2 and 8 hours.

A magnetic activated carbon prepared using the process of the present invention is novel and unique in that it comprises specific properties and/or combination of properties such as a surface area ($S_{BET}$ or $S_L$) between 250 and 1500 m²/g, or 500 and 1000 m²/g, a total pore volume between 0.050 and 2.0 cm³/g, or 0.250 and 1.0 cm³/g, a micropore volume between 0.005 and 0.5 cm³/g, or 0.050 and 0.30 cm³/g, and/or an iron content between 1 and 20 wt %, or 2 and 10 wt. % of the weight of the magnetic activated carbon.

Further, the diameter of the iron oxide nanoparticles is larger than the size of the pores in the carbonized biomass. The diameter may be between 5 and 75 nm, or 10 and 50 nm.

The nanoparticles are preferably crystallized. Preferably more than 50%, or more than 70%, or more than 80%, or more than 90%, or more than 95%, or more than 99% of the nanoparticles are crystallized. In another embodiment, at least 99.9%, or 98%, or 95%, or 90%, or 80%, or 70%, or 50% of the nanoparticles are crystallized.

The properties of the magnetic activated carbon according to the invention may be present in any combination of properties and ranges mentioned above.

A method for separation of pollutants from liquids and/or a gas Magnetic activated carbon may be used to separate particles from a liquid and/or a gas. For example the magnetic activated carbon may be used to purify water. The particles may be any element, substance, molecule or atom that needs to be removed from the liquid and/or gas.

The method may comprise the steps outlined below.

In step 1) the magnetic activated carbon is provided in a container, which may be a basin or pipe, or any other device that can hold the magnetic activated carbon and allows the liquid and/or gas to come into contact with the carbon.

In step 2) the magnetic activated carbon is contacted with the liquid and/or gas. The magnetic activated carbon mixes with the liquid and/or a gas, whereby the particles such as molecules, ions and small pollutants that are present in the liquid, are adsorbed. Hereby, the liquid and/or gas will be purified from such particles.

In step 3) an electromagnetic field is applied in or across said container. The activated magnetic carbon is concentrated into a small area on the inside of said container and separated from the liquid and/or a gas.

In step 4) the liquid and/or a gas is removed from the container.

In step 5) the electromagnetic field is ceased.

Optionally, the container comprising the carbon is filled with a new batch of liquid and/or a gas in a step 6).

The process steps 3) to 6) can be repeated several times until the adsorbent (i.e. the magnetic carbon material) is saturated and needs to be replaced with fresh material.

Further optionally, the used magnetic activated carbon may be upgraded or destroyed in a subsequent step 7).

A Method for Separation of Gases.

Magnetic activated carbon adsorbs gases like carbon dioxide, nitrogen and methane. The material can be tailored for selective uptake of a given gas.

Gas is desorbed from the adsorbent agent either by lowering of the total pressure, a so called Pressure Swing Adsorption (PSA), or by increasing the temperature of the adsorbent, a so called Temperature Swing Adsorption (TSA), or by a combination of both PSA and ISA. Magnetic activated carbon can preferably be used in TSA processes. The iron particles in magnetic activated carbon are heated by an oscillating electromagnetic field and the heat transfers to the ambient carbon structure. When the activated carbon composite is heated the gas molecules desorb. When all gas is released the adsorbent is cooled and ready for a new uptake of gas. Magnetic activated carbon can be reused a large number of cycles without degradation.

A high frequency oscillating electromagnetic field can be applied to heat the activated magnetic carbon.

EXPERIMENTAL SECTION

Materials

Different biomasses and/or biowastes were used: grass cutting, organic waste from beer production (beer waste), horse manure and bio-sludge. Biomass was divided into pieces of about a centimeter and placed in an autoclave reactor. Water, organic acid and a small amount of $Fe^{2+}$. The temperature was increased to 180-230° C., and the pressure equilibrated to 10-20 bar. After a few hours, the slurry of HTC biomass and water was pumped to a large vessel and equilibrated for 5-6 h at a somewhat elevated temperature (between 25 and 80° C.), after which it was cooled and filtered. Moisture, ash, and element analyses of HTC biomass were performed using standardized methods.

Reactor

Figure 1B:
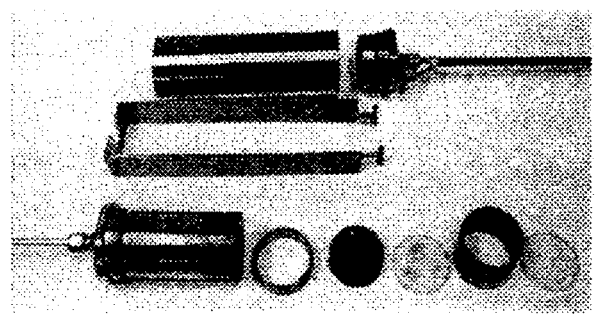

A reactor in stainless steel for the activation of HTC biomass is shown in FIG. 1. The reactor comprises a reactor chamber 7 and a heater 8, a thermal couple 2 and a heat exchanger 4. Also shown are a gas outlet 1, gas inlet 5, a gas distributor 6 and metal filter 3. Its vertical design, fed with gas that entered from below, ensures a good contact between particles of HTC biomass and $CO_2$. The reactor was enclosed in a vertical tubular furnace. $CO_2$ was fed from below and heat exchanged to a high temperature within the furnace before contacting the HTC biomass. Heat exchange was performed in a stainless steel cylinder that was filled with steel nuts. This heat exchanger was placed just below the bed of HTC biomass. The HTC biomass was constrained by two crossed metallic meshes with a bed volume of about 50 ml. Quartz filters may optionally be used. Temperature was measured by a thermocouple placed just above the bed. Most parts of the reactor were kept in place by gravity. Conically shaped connectors allowed the reactor to be easily mounted and dismounted.

Activation

In each batch about 5 g of HTC biomass was activated in a flow of $CO_2$. Temperature was ramped from room temperature to the set temperature, at a rate of 10° C./min. At the set temperature, the samples were activated for a designated time. Afterwards, the activated HTC biomass was cooled to room temperature. When the designated activation time was 0 h, heating was stopped immediately when the set temperature was reached. $CO_2$ was flown through the reactor bed during all steps for all activations.

Characterization $^{13}$C NMR spectra were recorded on a Bruker AVANCE III spectrometer operating at 151 MHz in 4 mm probe head in a double resonance mode. The magic angle spinning (MAS) was 14 kHz. The $^{13}$C NMR chemical shift scale was externally calibrated using an adamantane sample. Direct polarization $^{13}$C NMR using 45 pulses and a recycling time of 5 s avoided partial saturation of the spectra. Typically 8-16 k scans were summed. Exponential filtering was used with a small amount as compared to the widths of the spectral lines. Spectra were processed in the Topspin software. Nitrogen adsorption isotherms were measured at 77K using a Micromeritics ASAP2020 device. Before conducting the adsorption experiments, samples were degassed under conditions of dynamic vacuum at a temperature of 300° C. for 5 h. Specific surface areas ($S_{BET}$ and $S_L$) were calculated using standard expressions for Brunauer-Emmet-Teller (BET) and Langmuir isotherms. For both analyses, BET and Langmuir, uptake of nitrogen at relative pressures of $p/p0=0.06-0.29$ were used. The total pore volume (Vt) was estimated from the uptake at a $p/p_0=0.99$. The t-plot method was used to estimate micropore volume, $V_{mic}$ and external surface area, $S_{ext}$. (Micropores are smaller than 2 nm and mesopores are in the range of 2 nm to 50 nm.) The specific micropore surface area, $S_{mic}$, was approximated as the difference between $S_{BET}$ or $S_L$ and $S_{ext}$. The distributions of pore sizes in the samples were determined by means of original density functional theory (DFT) using the Micromeritics' routines.

Atomic absorption spectrophotometry was performed on a PHILIPS PU 9100 atomic absorption spectrophotometer with a long rectangular 10 cm burner. The light source used was a 37 mm Fe- hollow cathode lamp working at operating current of 10 mA. Carbon samples were burned in a furnace at 600° C. to get ash before an Fe ions was dissolved in an HCl and $HNO_3$ mixed acid. After dilution, the solutions were sprayed into an air/acetylene flame. The air/acetylene flow rates were fixed constant at 5 and 1.3 l/min, respectively. The absorbance at 248.3 nm was recorded for the different samples and the concentrations of Fe were calculated.

XPS spectra were recorded using a Kratos AXIS Ultra-DLD x-ray photoelectron spectrometer (Kratos Analytical, Manchester, UK). The samples were analysed using a monochromatic Al x-ray source. The analysis area was below about 1 $mm^2$ (most of the signal is from an area of 700×300 μm).

X-ray diffraction (XRD) was used to identify the nano-sized crystals embedded in the samples. The XRD patterns of the magnetic activated HTC biomass were collected using an X'PERT-PRO PANalyical powder diffractometer with an X'Celerator detector (CuKa1 radiation, k=1.5418 Å) between $2\theta=20.0-70.0°$ under reflection mode.

The TEM was performed on a JEOL TEM (JEM-2100) operated at 200 kV. A tilt series of TEM images were recorded covering a range of 126° with a tilt step of 2° (63 images in total). ImageJ was used to preprocess the tilted-series images and TomoJ was employed for tomographic reconstruction. The specimens were dispersed in absolute ethanol and treated by ultrasonification for 10 minutes. A droplet of the suspension was transferred to a copper grid. In order to facilitate image alignment in tomographic reconstruction, a droplet of suspension containing well-dispersed Au nano-particle of 10 nm in size was subsequently applied to the copper grid. The images were aligned according to the Au markers. 15 iterations of the ART algorithm were run in TomoJ with a relaxation coefficient of 0.1.

SEM micrographs were recorded with JEOL JSM-7000F and JEOL JSM-7401F scanning electron microscopes, with accelerating voltages of 2.0 and 1.0 kV, respectively. Samples were spread thinly onto Oxford Aluminium stubs and coated by dried colloidal carbon.

Figure 6:
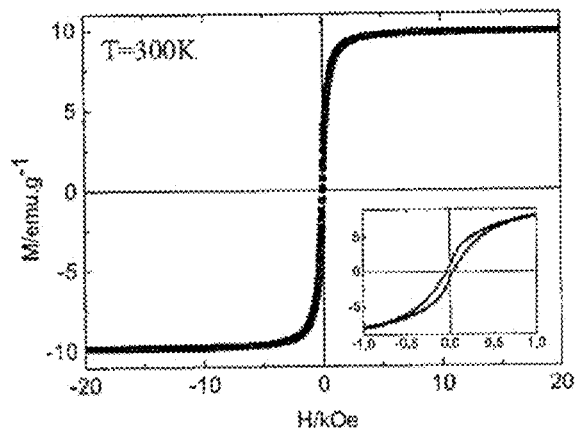
FIG. 6 shows a magnetization curve of the magnetic activated carbon prepared from hydrothermally carbonized (HTC) Horse Manure.

Magnetic hysteresis loops of the material were measured using a Quantum Design PPMS instrument. Few milligrams of powder were loosely packed in polypropylene cups and measured at 300 K in a magnetic field that varied from −20 kOe to +20 kOe. The results are shown in FIG. 6.

Results and Discussion

Characterization of Activated HTC Biomass

The properties of the activated carbons depended on both the chemical nature of the HTC biomass and process conditions applied. Activated HTC grass cuttings and HTC horse manure had specific surface areas similar to an activated carbon with a commercial origin, see Table 1. Activated carbon from HTC beer waste and HTC biosludge had lower specific surface areas than the others. The more significantly reduced surface area for activated HTC biosludge could be ascribed to its large amount of inert ash. The yields were higher for the activation of HTC beer waste and HTC grass cutting into activated carbons, than for HTC horse manure and HTC biosludge. The higher yields correlated to a higher degree of carbonization. Table 1 presents data for activated carbons activated at fixed process conditions.

The Langmuir model described adsorption data recorded on microporous carbons well, and the BET model described adsorption data recorded on mesoporous carbons well. In the latter multilayer adsorption can take place. FIG. 2 presents $N_2$ adsorption isotherms, a) horse manure, b) grass cutting, c) beer waste and d) biosludge, e) commercial activated carbon, and f) pore size distribution of commercial activated carbon and activated carbons prepared from four hydrothermally carbonized (HTC) biomass horse manure (■); grass cutting (▲); beer waste (●); biosludge (▼); commercial activated carbon (♦).

Figure 2A:
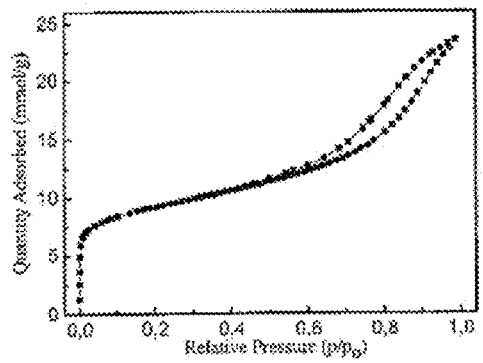
FIGS. 2A-2F shows $N_2$-adsorption isotherms and pore size distribution of activated carbons prepared form four hydrothermally carbonized (HTC) biomass at 800° C. with $CO_2$ at a flow rate of 17 $dm^3/h$ and an activation time of 2 h.
Figure 2B:
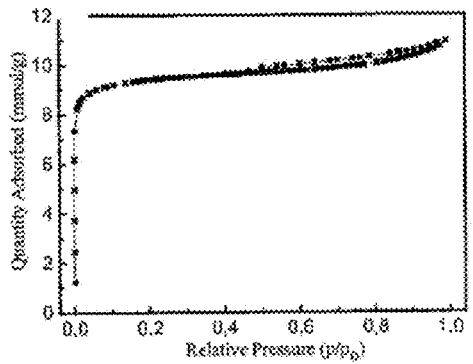
Figure 2C:
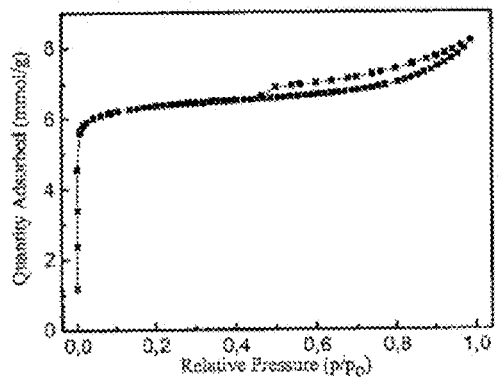
Figure 2D:
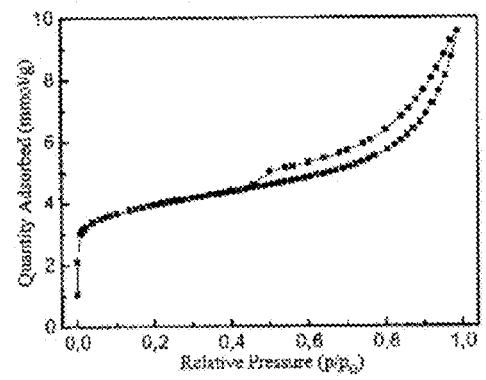
Figure 2E:
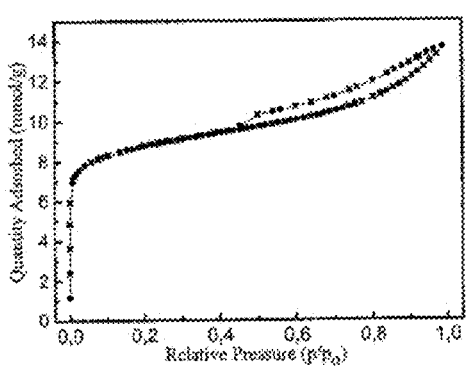
Figure 2F:
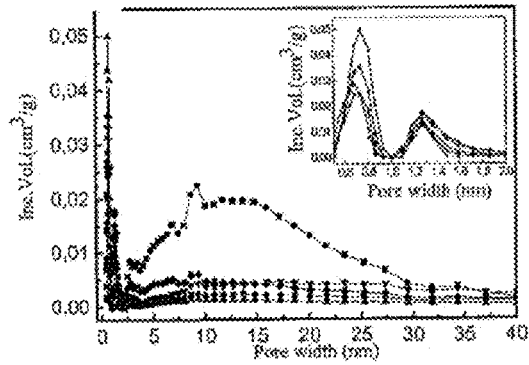

Isotherms for uptake of $N_2$ on activated HTC grass cutting and HTC beer waste reveal features of microporous materials combined with small amount of larger pores. Type I behaviour according to the classification of IUPAC is visible at the low relative pressure, and the small hysteresis loop is indicative of mesoporosity. For activated HTC horse manure, HTC biosludge and commercial activated carbon, the $N_2$ isotherms show large hysteresis loop for adsorption and desorption, which are typical for capillary condensation and mesoporosity. FIG. 2f presents associated distributions of pore sizes that were estimated from the adsorption branch using DFT. A slit model was used in the DFT model for the pores (See TEM image in FIG. 4a). The mesopores in the activated carbon from HTC horse manure show a broad distribution with an average slit size of about 14 nm. The microporosity shows an apparent bimodal distribution of slits peaked at 0.7 and 1.3 nm.

TABLE 1

Yield, ash content, and textural properties of activated carbon of hydrothermally carbonized (HTC) biomass activated at 800° C. with $CO_2$ at a flow rate of 17 $dm^3/h$ and an activation time of 2 h. Textual properties were determined by Nitrogen adsorption.

| HTC biomass | Yield (wt. %) | Residue (wt. %) | Surface area ($m^2/g$) | | | | Pore volume ($cm^3/g$) | |
|---|---|---|---|---|---|---|---|---|
| | | | $S_{BET}$ | $S_L$ | $S_{ext}$ | $S_{mic}$ | $V_t$ | $V_{mic}$ |
| Horse manure | 13.1 | 37.4 | 682 | — | 405 | 277 | 0.816 | 0.141 |
| Grass cutting | 31.0 | 12.0 | — | 940 | 99 | 841 | 0.379 | 0.281 |
| Beer waste | 24.1 | 16.3 | — | 636 | 64 | 572 | 0.283 | 0.192 |

TABLE 1-continued

Yield, ash content, and textural properties of activated carbon of hydrothermally carbonized (HTC) biomass activated at 800° C. with $CO_2$ at a flow rate of 17 dm³/h and an activation time of 2 h. Textual properties were determined by Nitrogen adsorption.

| HTC biomass | Yield (wt. %) | Residue (wt. %) | Surface area (m²/g) | | | | Pore volume (cm³/g) | |
|---|---|---|---|---|---|---|---|---|
| | | | $S_{BET}$ | $S_L$ | $S_{ext}$ | $S_{mic}$ | $V_t$ | $V_{mic}$ |
| Biosludge | 14.9 | 55.9 | 286 | — | 136 | 150 | 0.331 | 0.077 |
| Commercial | — | 9.3 | 623 | — | 218 | 405 | 0.474 | 0.208 |

Figure 3:
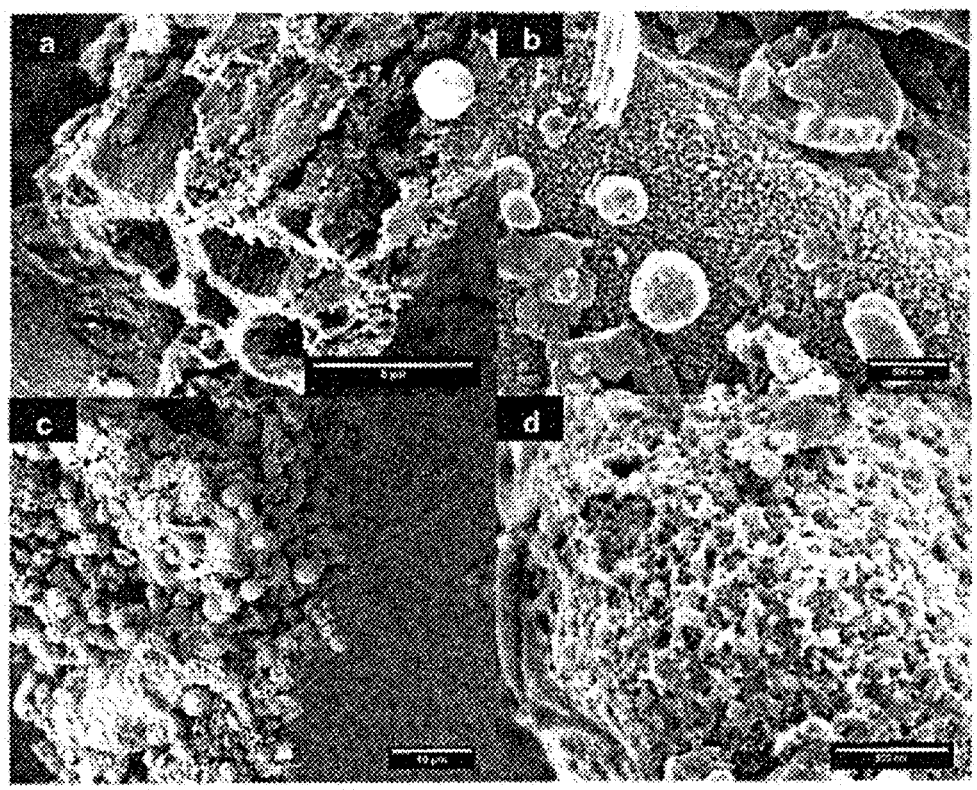
FIG. 3 shows Scanning Electron Microscopy (SEM) images of activated carbon from HTC horse manure (a), HTC☐horse manure (b), HTC☐beer waste (c) and HTC☐biosludge (d).

FIG. 3 shows a) activated carbon from HTC horse manure, whereby the underlying shapes in the biomass have survived both HTC and activation in $CO_2$; b) activated carbon from HTC horse manure shows mesopores; c) activated HTC beer waste shows carbon spheres; d) activated HTC biosludge shows mesopores. The SEM micrograph in FIG. 3a visualizes that the outer shapes of HTC horse manure largely remained after hydrothermal carbonization and subsequent activation in a flow of $CO_2$ at an elevated temperature. The preserved shapes of the underlying objects (cells etc) could allow for complex forms of activated carbons to be produced by an appropriate choice of biomass. Such preserved shapes could speculatively circumvent a need to use post-synthetic structuring of the activated carbons. In the SEM micrograph of FIG. 3b for an activated carbon from HTC horse manure, there are significant amounts of mesopores (about 15 nm) were visible. This average size is consistent with the scale established by analysis of $N_2$ adsorption data compare to the distribution in FIG. 2b. The surface of activated carbon from HTC grass cutting did not display many mesopores (FIG. S11b). Additional SEM micrographs are presented in the supplementary information. (FIGS. S9-S11) In the SEM micrograph of FIG. S11a, it seems that volatile compounds, within the particle, were expelled during activation and produced bubbles on the surface of the particle. A big bubble was broken and clearly displayed mesopores.

Figure 4:
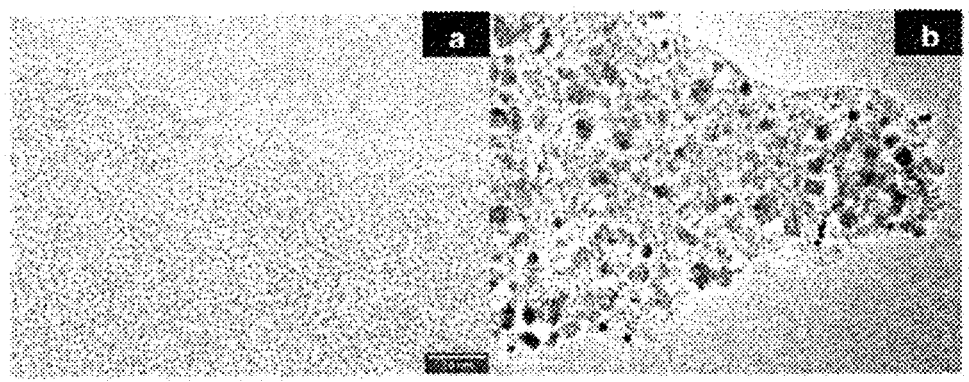
FIG. 4 shows a Transmission Electron Microscopy (TEM) image of activated carbon from HTC grass cutting (a), and image of iron oxide nanoparticies in the magnetic activated carbon prepared from hydrothermally carbonized (HTC) horse manure (b).

FIG. 4 displays transmission electron microscope (TEM) images for activated carbon from HTC biomass. In FIG. 4a, slit shaped pores with the size about 1 nm are randomly spread in the activated carbon for HTC grass cutting. FIG. 4b displays octahedrally shaped nanoparticles in the activated carbon prepared from hydrothermally carbonized (HTC) horse manure. To further image the distribution of the nanoparticles with the activated carbon an electron tomography was conducted, which allows the three-dimensional structure of the specimen to be reconstructed by slicing through the reconstructed tomogram. Octahedrally shaped particles of iron oxides were embedded within the activated carbon. From the slices of the tomogram, pores of different sizes are clearly seen, and they are randomly distributed throughout the magnetic activated carbon.

Figure 5:
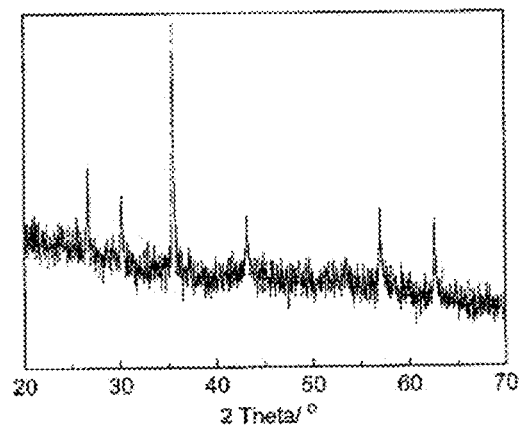
FIG. 5 shows an X-ray diffraction pattern of magnetic activated carbon prepared from hydrothermally carbonized horse manure.

Magnetism of the Composite Particles of Activated Carbon and Iron Oxide Nanoparticles The atomic gitter of the iron particles was determined by powder X-ray diffraction (XRD). FIG. 5 shows an XRD pattern of crystallized iron oxide ($Fe_3O_4$), at 800° C. with $CO_2$ at a flow rate of 17 dm³/h and an activation time of 2 h in the activated carbons prepared from hydrothermally carbonized (HTC) horse manure. The size of the iron oxide nanoparticles is about 20-40 nm, which is significantly larger than the size that would have been expected if the iron oxide nanoparticle had been precipitated in an already activated carbon. Integrated and large iron oxide nanoparticles are important for magnetic separation purposes. The reason for why iron oxide nanoparticles are larger than the pore dimensions is related to the catalytic nature of iron in the hydrothermal carbonization process and the fact that iron was included in the HTC biomass prior to the activation of the HTC biomass. This dual process with a catalytically driven hydrothermally carbonization of biomass in which iron is trapped, followed by activation in $CO_2$ allows large nanoparticles of iron oxide to be integrated in the activated carbon. These large nanoparticles are prone to dissolution as compared with the prior art technologies that employ precipitation of small nanoparticles of iron oxide within the porous structure of activated carbon.

Figure 7:
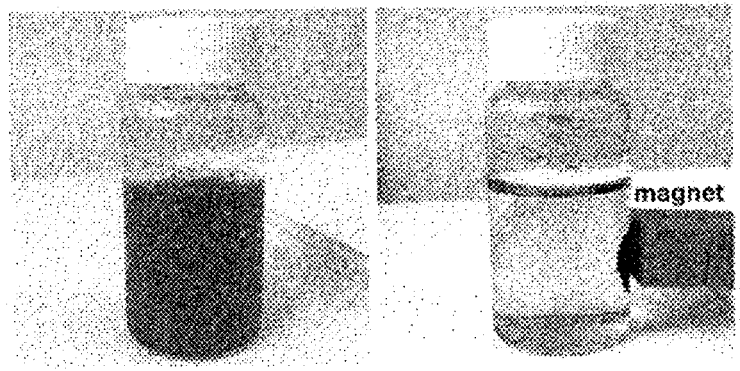
FIG. 7 shows a separation of particles of magnetic activated carbon, in an aqueous suspension by a small magnet.

The $Fe_3O_4$ nanoparticles, embedded in the particles, as seen from the tomography, rendered activated composite carbons magnetic. FIG. 6 displays a magnetization curve of a magnetic activated composite carbon prepared from hydrothermally carbonized (HTC) horse manure at 800° C. with $CO_2$ at a flow rate of 17 dm³/h and an activation time of 2 h. Inset shows the low field region of the hysteresis. The curves show that the embedded iron oxide particles display both superparamagnetic and ferrimagnetic characteristics. The superparamagnetic properties originate from smaller iron oxides particles <10-30 nm (below the so-called superparamagnetic limit ~30 nm) (Ref: Cornell and Schw, p 166) and the ferrimagnetic properties from larger iron oxides particles (>30 nm). The saturation magnetization with respect to the calculated weight of the $Fe_3O_4$ phase is high (90 emu/g, 300K) and close to the value reported for bulk $Fe_3O_4$ (93 emu/g, 290 K). (Ref 79) As can be seen in FIG. 7, the magnetic powder of activated composite carbon was easily separated from a dispersion by using a small magnet. When the magnetic field was removed the main part of the activated composite particles loses their magnetism due to its (super)paramagnetism but some particles in the composite retained their magnetization due to their larger size. The coercivity of the composite was $H_c$=40 Oe at 300K. A combination of the high saturation magnetization and the high specific surface areas and small pores of activated carbon will enable new possibilities for applications related to separation of molecules from water and other liquids. Separation of gas components in a mixture of gases could also be facilitated by the possibilities of very rapid temperature rise, via the interactions of nanoparticles of iron oxide with electromagnetic radiation. The embedded nanocrystals could strengthen the heat and energy absorption by applying radio frequency, when it comes to desorption.

Study of the HTC Biomass

Figure 8A:
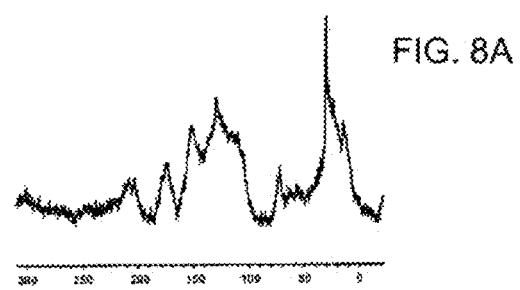
FIGS. 8A and 8B show a $^{13}C$ Nuclear Magnetic Resonance (NMR) spectra for hydrothermally carbonized (HTC) biomass. (a) HTC grass, (b) HTC horse manure.

Solid state $^{13}C$ NMR spectra was recorded to investigate molecular structures of the HTC biomass before activation. A direct polarization solid state $^{13}C$ NMR spectrum for HTC grass cutting is shown in FIG. 8a. The colour of HTC grass cutting was black, and the atomic composition and its $^{13}C$ NMR spectrum indicated that it was similar to lignite in its chemical composition and structure. A $^{13}C$ NMR chemical shift of about 170 ppm indicated a presence of acid groups, about 210 ppm ketones, about 100 and about 150 ppm sp2 hybridized carbons with and without oxygen, about 130 ppm aromatic groups and about 30 ppm sp3 hybridized aliphatic carbons.

Figure 8B:
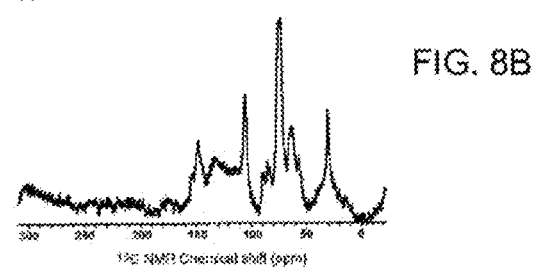
Figure 9:
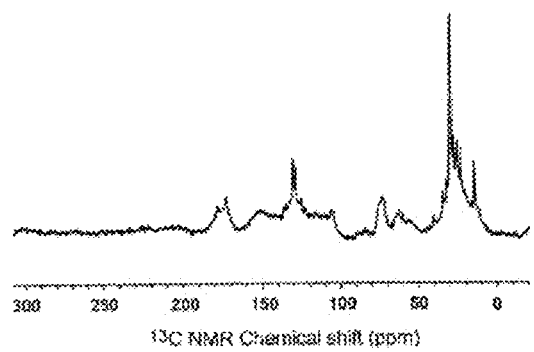
FIG. 9 shows a $^{13}C$ Nuclear Magnetic Resonance (NMR) spectrum of hydrothermally carbonized (HTC) beer waste.
Figure 10:
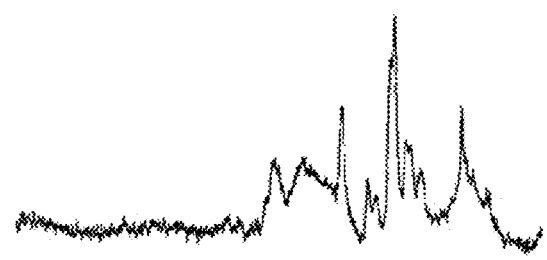
FIG. 10 shows a $^{13}C$ Nuclear Magnetic Resonance (NMR) spectrum of hydrothermally carbonized (HTC) biosludge.
Figure 11:
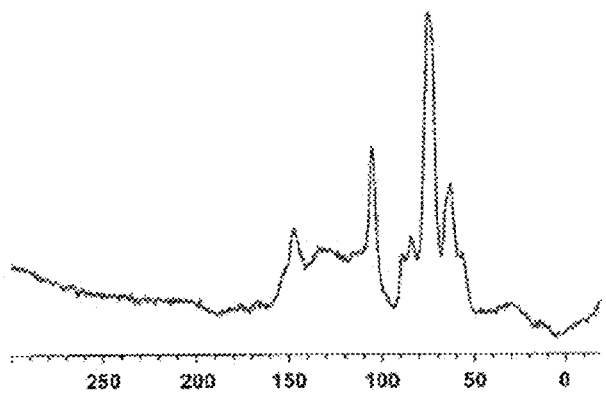
FIG. 11 shows a $^{13}C$ Nuclear Magnetic Resonance (NMR) spectrum of hydrothermally carbonized (HTC) horse manure after extraction in acetone.
Figure 12A:
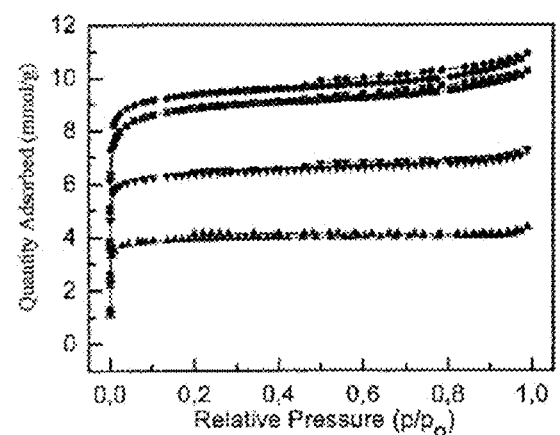
FIGS. 12A and 12B shows a) $N_2$-adsorption isotherms and b) pore size distribution of activated carbons prepared from hydrothermally carbonized (HTC) grass cuttings, prepared at different temperatures, activation times and gas flow rates. "▲" 600° C.-2 h-17 $dm^3/h$; "▼" 700° C.-2 h-17 $dm^3/h$; "●" 800° C.-2 h-17 $dm^3/h$; "■" 800° C.-2 h-48 $dm^3/h$.
Figure 12B:
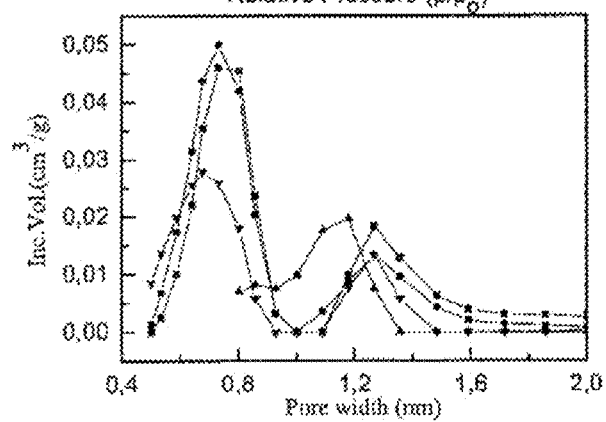
Figure 13A:
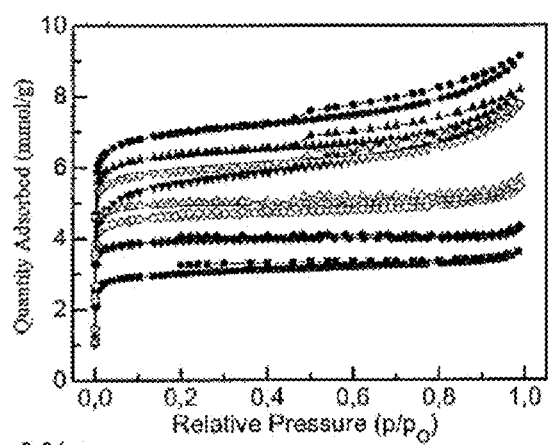
FIGS. 13A and 13B shows a) $N_2$-adsorption isotherms and b) pore size distribution of activated carbons prepared from hydrothermally carbonized (HTC) beer waste prepared at different temperatures, activation times and gas flow rates "■" 600° C.-2 h-17 $dm^3/h$; "◆" 700° C.-2 h-17 $dm^3/h$; "◇" 800° C.-0 h-17 $dm^3/h$; "△" 800° C.-0 h-48 $dm^3/h$; "∇" 800° C.-1 h-17 $dm^3/h$; "▲" 800° C.-2 h-17 $dm^3/h$; "●" 800° C.-2 h-48 $dm^3/h$; "▼" 800° C.-8 h-17 $dm^3/h$.
Figure 13B:
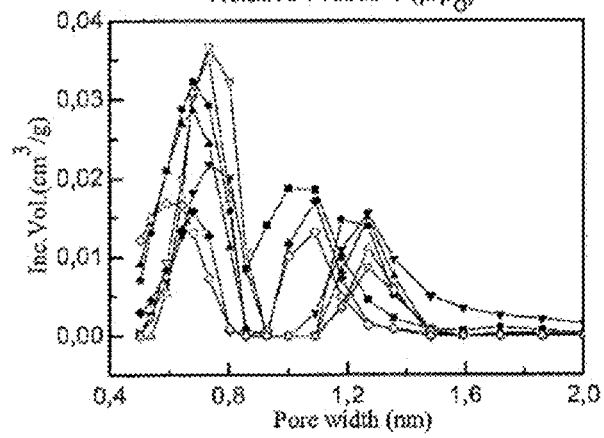
Figure 14A:
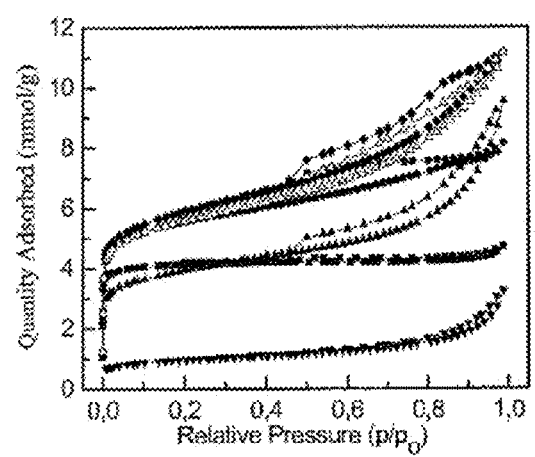
FIGS. 14A and 14B shows a) $N_2$-adsorption isotherms and b) pore size distribution of activated carbons prepared from hydrothermally carbonized (HTC) biosludge, prepared at different temperatures, activation times and gas flow rates "■" 600° C.-2 h-17 dm³/h; "●" 700° C.-2 h-17 dm³/h; "♦" 800° C.-0 h-17 dm³/h; "Δ" 800° C.-0 h-48 dm³/h, "▲" 800° C.-2 h-17 dm³/h; "▼" 800° C.-2 h-48 dm³/h.
Figure 14B:
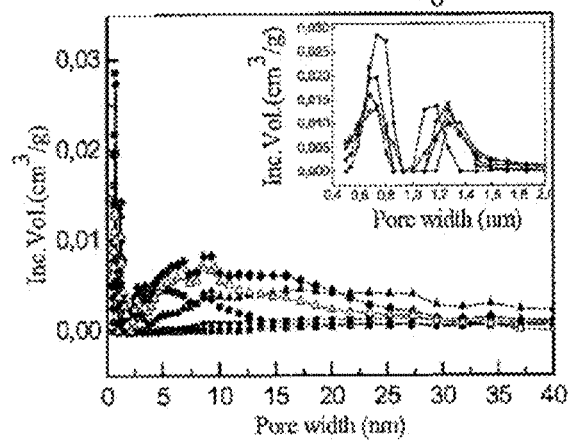
Figure 15A:
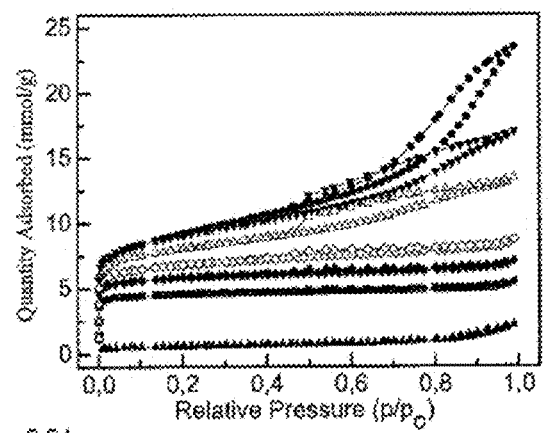
FIGS. 15A and 15B shows a) $N_2$-adsorption isotherms and b) pore size distribution of activated carbons prepared from hydrothermally carbonized (HTC) horse manure prepared at different temperatures, activation times and gas flow rates "■" 600° C.-2 h-17 dm³/h; "♦" 700° C.-2 h-17 dm³/h; "◊" 800° C.-0 h-17 dm³/h; "Δ" 800° C.-0 h-48 dm³/h; "▼" 800° C.-1 h-17 dm³/h; "●" 800° C.-2 h-17 dm³/h; "▲" 800° C.-2 h-48 dm³/h.
Figure 15B:
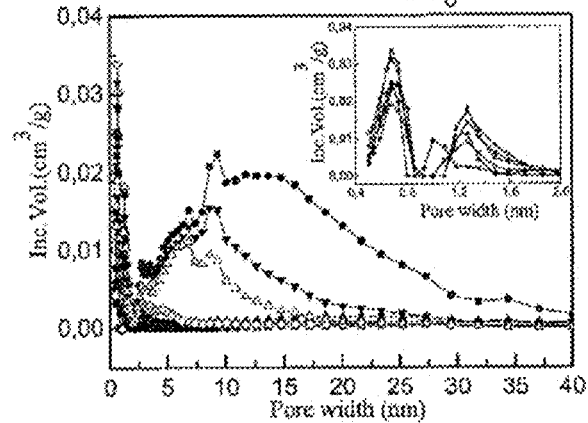
Figure 16A:
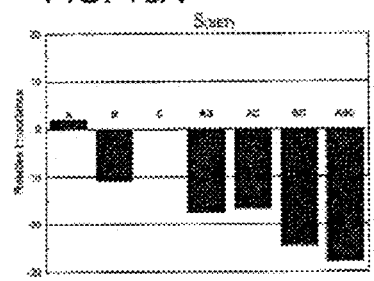
FIGS. 16A-16E shows an impact of the three factors on a) BET surface area, b) Micropore surface area, c) Total pore volume, d) Micropore volume and e) Weight loss, from full factorial design. The symbol "+" represents the high level of each factor, "−" represents the low level; O/C ratio is coded as "A", flow rate is "B" and activation time is "C".
Figure 16B:
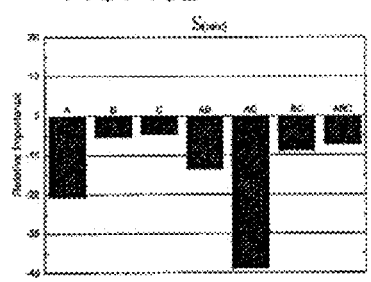
Figure 16C:
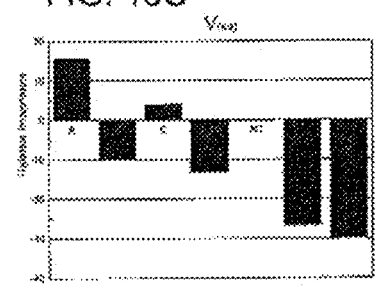
Figure 16D:
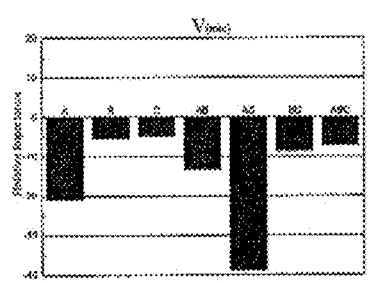
Figure 16E:
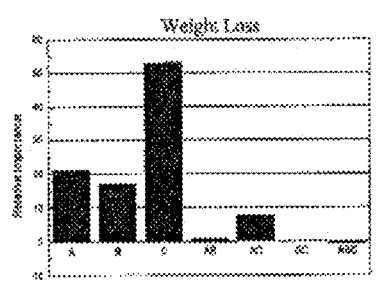
Figure 17:
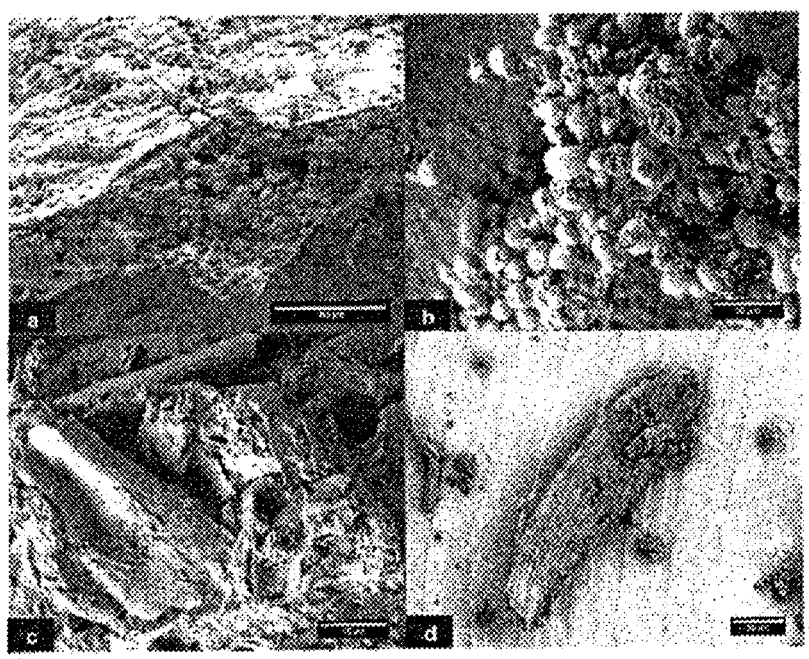
FIG. 17 shows scanning electron micrographs showing the morphology of the hydrothermally carbonised (HTC) biomasses; a) grass cutting, b) beer waste, c) biosludge, d) horse manure.
Figure 18:
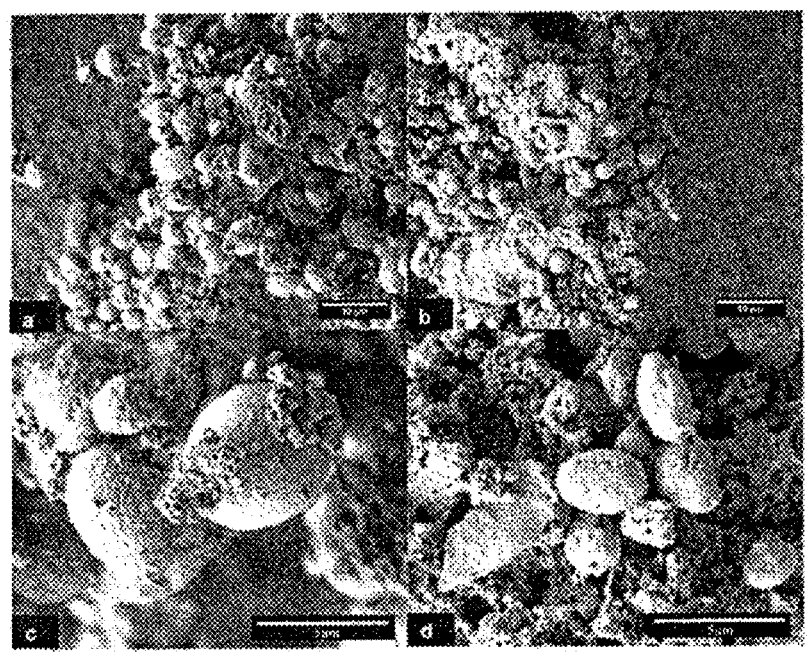
FIG. 18 shows scanning electron micrographs showing the morphology of hydrothermally carbonised (HTC) beer waste (a,c) and $CO_2$-activated HTC beer waste (b,d) at different magnifications.
Figure 19:
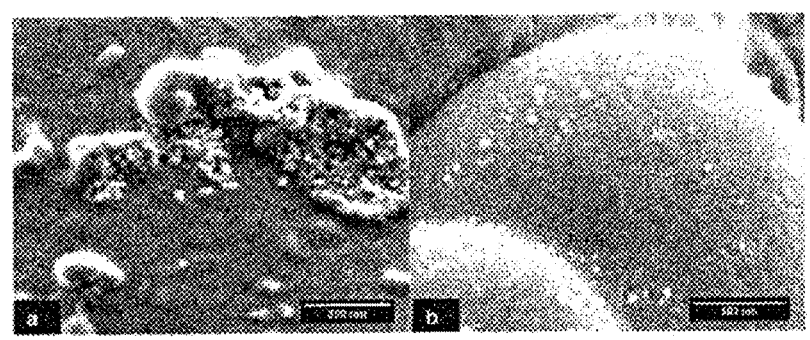
FIG. 19 shows scanning electron micrographs showing growing mesopores during $CO_2$-activation at 700° C. of hydrothermally carbonised (HTC) horse manure (a), grass cutting (b).
Figure 20:
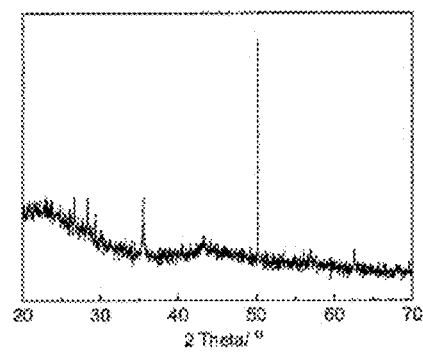
FIG. 20. shows a XRD pattern of magnetic activated carbon prepared from hydrothermally carbonized (HTC) grass cutting at 800° C. with $CO_2$ at a flow rate of 17 dm³/h and an activation time of 2 h
Figure 21:
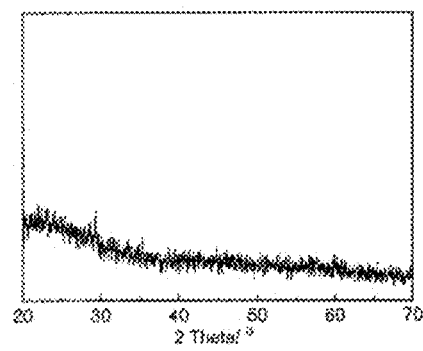
FIG. 21 shows a XRD pattern of magnetic activated carbon prepared from hydrothermally carbonized (HTC) beer waste at 800° C. with $CO_2$ at a flow rate of 17 dm³/h and an activation time of 2 h.
Figure 22:
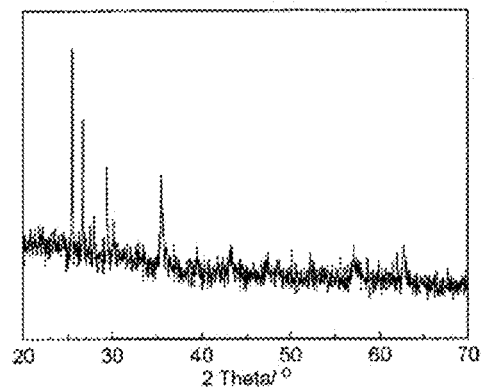
FIG. 22 shows a XRD pattern of magnetic activated carbon prepared from hydrothermally carbonized (HTC) biosludge at 800° C. with $CO_2$ at a flow rate of 17 dm³/h and an activation time of 2 h.

In the solid state $^{13}$C NMR spectrum for HTC horse manure (FIG. 8b), peaks at 65, 72, 75, 84, 89 and 105 ppm was attributed to the unreacted cellulose. The solid state $^{13}$C NMR spectrum from HTC horse manure in FIG. 8b showed that this solid had more similarities to peat than to lignite. These similarities were consistent with the brown colour and the element composition of the solid. In these less condensed solids, acid and ketone groups were missing. Instead, there were indications of remaining groups of a O—CHx type by their characteristic chemical shifts of about 60-80 ppm. The fraction of sp2 hybridized carbons was smaller than for HTC grass cutting, indicating a lower degree of carbonisation for these brown solids. The large amount of O—CHx groups in HTC horse manure could explain the comparably lower yield, and larger amount of mesopores prior to their activation, see Table 1. Solid state $^{13}$C NMR spectra for HTC beer waste and biosludge are presented in FIG. S1 and FIG. S2. The signals at 175 ppm and 210 ppm in FIG. S1 indicate acid groups and ketone groups and the distinct signals at 60-80 ppm in FIG. S2 indicate O—CHx moieties. A spectrum recorded on HTC horse manure after extraction (Soxlet) in acetone is presented in FIG. S3. The spectrum of the extracted solid had no significant signals in its aliphatic region, but was otherwise very similar to the spectrum of the non-extracted HTC horse manure in FIG. 8b. The extracted fraction contained compounds with significant amounts of methylene groups, possibly related to lipids, or their degradation products. The degree of extraction was higher in acetone than in pentane. The liquid fraction may also contain some polar groups.

XPS was performed for the four HTC biomass samples. The XPS method provides quantitative chemical information for the outermost 2-10 nm of surfaces. Both the elemental composition and different chemical states of carbon are analyzed. Table 4 shows the elemental composition, and Table 2 shows the different chemical states of carbon. Both C and O composition on the surface are different from the average C and O value for each sample. HTC horse manure has more C composition and less O on the surface compared with the corresponding C and O for the average value. The O/C atomic ratios on the surface are different from the average values for each of the four samples. I-ITC horse manure and biosludge have lower O/C atomic ratio on the surface than the average number, which means they are carbonized better on the surface during hydrothermal carbonization. While HTC beer waste has the opposite tendency, which also means it doesn't carbonized well on the surface compared to the other parts. In Table 2, different chemical states of carbon are determined. Carbons are sorted into four types according to the different functional groups: unoxidised carbon (C1-carbon: C—C, C—H, C=C groups, such as found in hydrocarbon chains/aromatic groups), one bond to oxygen (C2-carbon: C—O, C—O—C functional groups), more oxidised carbon C3-carbons and C4-carbons (e.g. ester and carboxylic acid functional groups). For the four samples, most of the total carbon (60-73%) is present as unoxidised carbon (C1-carbon), with HTC horse manure having the highest value for C1.

The magnetic activated carbon according to the invention is suitable for use in separation and/or purification of gases and fluids. Other uses may be for separation and/or purification of water, medical application, aquarium pumps, industrial water treatment, decaffeination processes, sewage treatment, chemical spill clean-up, decolourization, odour removal, support for catalysts, nitrogen purification, oxygen purification, biogas upgrading, natural gas upgrading, fuel cells, supercapacitors, and the like.

TABLE 2

The chemical shifts of hydrothermally carbonized HTC biomass, in the high-resolution carbon spectra (with the binding energy positions for each carbon peak after adjusting C1-carbon to 285.0 eV as the reference value) determined by Chemical surface composition (XPS).

| | C 1 s tot = 100% | | | | |
|---|---|---|---|---|---|
| Sample | C 1 285.0 eV | C2 286.5-6 eV | C3 287.9-288.1 eV | C 4 288.9-289.1 eV | Atomic ratio O/C |
| HTC of: | | | | | |
| Grass cutting | 61.5 | 25.6 | 7.5 | 5.4 | 0.32 |
| Horse manure | 73.2 | 18.3 | 3.8 | 4.7 | 0.24 |
| Beer waste | 60.1 | 28.5 | 7.2 | 4.2 | 0.39 |
| Biosludge | 63.8 | 26.5 | 6.6 | 3.1 | 0.35 |

The chemical shifts are due to carbons in different functional groups mainly with oxygen. Values given are from curve fitting of different carbon peaks with the total amount of carbon = 100%.
C1: C—C, C=C, C—H;
C2: C—O, C—O—C;
C3: O—C—O, C=O, (N—C—O, N—C=O);
C4: O—C=O, C(=O)OH, (N—C(=O)—N)

Elemental composition, moisture, and ash content are presented for the HTC biomass in Table 3. HTC biosludge had much more ash than did other HTC biomass, due to the heterogeneous nature of biosludge from paper mills and related chemicals used. The moisture content was about 4-7 wt. % for HTC biomass, and this level is consistent with the somewhat hydrophilic nature of HTC biomass related to polar functionalities.

Fe2+ ions was added in the hydrothermal carbonization process in the form of metal salt. The Fe contents determined by atomic absorption spectrophotometry for the carbons of both before and after activation are presented in Table 5. Fe is concentrated during the activation process. It is interesting to compare the Fe content from XPS (Table 4) with that from atomic absorption spectrophotometry (Table 5). The concentration of Fe is much higher in XPS data than that in atomic absorption spectrophotometry. XPS detects elements on the surface of the sample, while atomic absorption spectrophotometry determines the average elemental content in the sample. It seems that, before activation, Fe in the HTC biomass is located mostly on the surface of the particles. The hydrothermal carbonization process could not get Fe into the carbon particles.

TABLE 3

Moisture, ash, element composition, and textural properties of hydrothermally carbonized (HTC) biomass

| HTC of: | Grass cuttings | Beer waste | Biosludge | Horse Manure |
|---|---|---|---|---|
| Proximate (wt. %) | | | | |
| Moisture | 6.5 | 3.9 | 4.5 | 5.2 |
| Ashes (dry basis) | 4.8 | 5.1 | 9.5 | 7.2 |
| Ultimate (wt. %, dry basis) | | | | |
| C | 61.9 | 59.5 | 53.3 | 53.2 |
| H | 5.3 | 6.6 | 6.1 | 5.9 |
| N | 2.62 | 5.16 | 0.79 | 1.34 |
| S | 0.28 | 0.49 | 0.40 | 0.38 |

TABLE 3-continued

Moisture, ash, element composition, and textural properties of hydrothermally carbonized (HTC) biomass

| HTC of: | Grass cuttings | Beer waste | Biosludge | Horse Manure |
|---|---|---|---|---|
| O$^a$ | 25.1 | 23.2 | 29.9 | 32.0 |
| O/C (atomic ratio) | 0.30 | 0.29 | 0.42 | 0.45 |
| H/C (atomic ratio) | 1.02 | 1.32 | 1.36 | 1.33 |
| $S_{BET}$ (m$^2$/g) | 6 | 25 | 10 | 8 |

TABLE 4

Relative surface composition in weight % and atomic ratios O/C of hydrothermally carbonized (HTC) biomass determined by X-ray Photoelectron Spectroscopy (XPS).

| | Weight ratio (%) | | | | | | | Atomic ratio |
|---|---|---|---|---|---|---|---|---|
| Sample | C | O | N | Fe | Ca | P | Si | O/C |
| HTC of: | | | | | | | | |
| Grass cutting | 64.27 | 27.70 | 1.97 | 3.31 | 0.59 | 0.92 | 1.24 | 0.32 |
| Horse manure | 67.27 | 21.21 | 1.01 | 8.88 | 0.58 | 0.45 | 0.6 | 0.24 |
| Beer waste | 58.29 | 29.98 | 3.94 | 3.23 | 0.58 | 1.56 | 0.81 | 0.39 |
| Biosludge | 60.49 | 28.01 | 0.69 | 8.30 | 1.69 | 0.22 | 0.59 | 0.35 |

TABLE 5

The content of Fe in hydrothermally carbonized (HTC) biowaste and activated HTC biowaste determined by atomic absorption spectrophotometry

| Samples | Fe (wt. %) |
|---|---|
| HTC of: | |
| Horse manure | 1.85 |
| Grass cutting | 0.79 |
| Beer waste | 0.80 |
| Biosludge | 1.51 |
| Activated HTC of: | |
| Horse manure | 7.54 |
| Grass cutting | 2.30 |
| Beer waste | 4.11 |
| Biosludge | 8.13 |

Study by Factorial Design

To optimize the activation of HTC biomass, the temperature was varied, flow rate of $CO_2$, and time for activation in the vertical reactor presented in FIG. 1. These parameters seem important to regular activation of various raw materials in a flow of $CO_2$. All the activated carbons showed increasing surface areas with increasing temperature for the activation. The yield decreased with an increasing temperature for all HTC biomass as expected. HTC grass cuttings and HTC beer waste were activated with a higher yield than the others as consistent with their lower O/C ratio. This high yield correlated well with a high degree of condensation as deduced from $^{13}$C NMR spectra. The small amount of oxygen atoms in the HTC biomass appeared to have limited deoxygenation (decarbonylation and decarboxylation reactions) and, hence, led to a high yield. Yield, specific surface areas and pore volumes were analysed for each sample and are presented in Table 7.

Numerous adsorption and desorption isotherms for $N_2$ were recorded on the activated carbons prepared from different HTC biomass. These isotherms and estimates of distributions of pores are presented in the supplementary FIGS. S4-7. From those data, is clear that HTC biomass activated at 600° C. had a monomodal distribution of pores. High levels of mesoporosity and microporosity developed in activated carbons from HTC biosludge by a very rapid treatment at 800° C., see $N_2$ adsorption isotherms in the supplementary information, FIG. S6. The degree of mesoporosity in activated carbons from HTC horse manure developed differently. Samples treated for 2 h had more mesopores than those treated for 1 h at otherwise identical conditions for the activation, see supplementary $N_2$ adsorption isotherms in FIG. S7. The influence of temperature was straightforwardly described as above, but full factorial design was applied to further analyze the activation. Such design was used to assess the effects of flow rate, activation time and O/C ratio in the activation of HTC biomass. The O/C ratio was varied by comparing results from HTC beer waste and HTC horse manure. Flows of 17 and 48 dm$^3$/h, and activation times of 0 or 2 h were used for activation at a set temperature of 800° C. The effects on weight loss, specific surface areas (BET), micropore areas, micropore volumes, and total pore volume were assessed by the factorial analyses. Detailed factorial analyses and their dependencies are presented in the supplementary information. (See Table 6 and FIG. S8)

TABLE 6

Full factorial design of three different factors.

| exp no. | A | B | C | AB | AC | BC | ABC | Weight Loss (%) | $S_{BET}$ (m$^2$/g) | $S_L$ (m$^2$/g) | $S_{mic}$ (m$^2$/g) | $V_{mic}$ (cm$^3$/g) | $V_{tot}$ (cm$^3$/g) |
|---|---|---|---|---|---|---|---|---|---|---|---|---|---|
| 1 | − | − | − | + | + | + | − | 70.8 | 319 | 463 | 278 | 0.143 | 0.189 |
| 2 | + | − | − | − | − | + | + | 71.1 | 479 | 702 | 337 | 0.173 | 0.302 |
| 3 | − | + | − | − | + | − | + | 74.0 | 340 | 492 | 314 | 0.161 | 0.197 |
| 4 | + | + | − | + | − | − | − | 79.3 | 580 | 859 | 330 | 0.169 | 0.465 |
| 5 | − | − | + | + | − | − | + | 75.9 | 438 | 636 | 374 | 0.192 | 0.283 |
| 6 | + | − | + | − | + | − | − | 86.9 | 685 | 1023 | 277 | 0.141 | 0.816 |
| 7 | − | + | + | − | − | + | − | 82.6 | 483 | 704 | 398 | 0.204 | 0.317 |
| 8 | + | + | + | + | + | + | + | 93.7 | 43 | 65 | 16 | 0.008 | 0.075 |

The symbol "+" represents the high level of each factor, "−" represents the low level;
O/C ratio is coded as "A", flow rate is "B" and activation time is "C".

Micropore area and volume depended negatively on the O/C ratio, and activated carbons from HTC beer waste that was well carbonized showed mainly such micropores. Total pore volume was, on the other hand, affected positively by a high O/C ratio or a long period of activation. These dependencies are consistent with that the pores grew during the activation, and that a rapid growth occurred for activation of HTC horse manure, which had a high O/C ratio. Specific surface area (BET) and pore volume depended negatively on the flow rate. These reductions indicated that the activated carbons started to "burn off" under more rapid flow of $CO_2$, which was further supported by the small yields for these activations.

The flow rate and the time together affected specific surface area (BET) and total pore volume. Combinations of both rapid flow and short time for activation, or slow flow and long time for activation, were beneficial. This synergism indicated an optimum in the volume of $CO_2$ needed, unit (flow time)=$dm^3$. Significant negative trilinear interactions were observed for specific surface area and total pore volume as well. A long time for activation gave a larger weight loss than a short one, as expected.

Different types of HTC biomass were synthesized together and activated into magnetic activated carbons in a flow of $CO_2$. The precursors for the magnetic nanoparticles of iron oxide are introduced in the hydrothermal carboniza-

TABLE 7

Yield and textual characteristics of activated hydrothermally carbonized (HTC) biomass as determined from nitrogen adsorption data at 77 K

| Type of HTC biomass, activation temperature (° C.) | Activation time (h) | Flow rate ($dm^3$/h) | Yield (wt. %) | Surface area ($m^2$/g) | | | | Pore volume ($cm^3$/g) | |
|---|---|---|---|---|---|---|---|---|---|
| | | | | $S_{BET}$ | $S_L$ | $S_{ext}$ | $S_{mic}$ | $V_t$ | $V_{mic}$ |
| Grass cuttings, | | | | | | | | | |
| 600 | 2 | 17 | 48.0 | — | 393 | 30 | 363 | 0.151 | 0.123 |
| 600 | 8 | 17 | 46.7 | — | 386 | 26 | 360 | 0.145 | 0.124 |
| 600 | 2 | 48 | 46.4 | — | 386 | 30 | 356 | 0.151 | 0.121 |
| 700 | 2 | 17 | 36.8 | — | 639 | 62 | 577 | 0.253 | 0.194 |
| 800 | 2 | 17 | 31.0 | — | 940 | 99 | 841 | 0.379 | 0.281 |
| 800 | 2 | 48 | 20.2 | — | 892 | 106 | 786 | 0.356 | 0.260 |
| 800 | 8 | 17 | 3.72 | — | — | — | — | — | — |
| Biosludge, | | | | | | | | | |
| 600 | 2 | 17 | 34.9 | — | 434 | 22 | 412 | 0.164 | 0.142 |
| 700 | 2 | 17 | 28.1 | 398 | — | 150 | 248 | 0.283 | 0.127 |
| 800 | 0 | 17 | 23.1 | 427 | — | 198 | 229 | 0.387 | 0.117 |
| 800 | 0 | 48 | 18.0 | 406 | — | 188 | 218 | 0.387 | 0.111 |
| 800 | 2 | 17 | 14.9 | 286 | — | 136 | 150 | 0.331 | 0.077 |
| 800 | 2 | 48 | 9.1 | 71 | — | 42 | 29 | 0.113 | 0.015 |
| 800 | 8 | 17 | 8.5 | 12 | 24 | — | — | 0.004 | — |
| Beer waste, | | | | | | | | | |
| 600 | 2 | 17 | 33.9 | — | 303 | 39 | 264 | 0.125 | 0.087 |
| 700 | 2 | 17 | 31.3 | — | 390 | 26 | 364 | 0.150 | 0.125 |
| 800 | 0 | 17 | 29.2 | — | 463 | 41 | 422 | 0.189 | 0.143 |
| 800 | 0 | 48 | 26.0 | — | 492 | 26 | 466 | 0.197 | 0.161 |
| 800 | 1 | 17 | 24.5 | — | 594 | 65 | 344 | 0.270 | 0.176 |
| 800 | 2 | 17 | 24.1 | — | 636 | 64 | 572 | 0.283 | 0.192 |
| 800 | 2 | 48 | 17.4 | — | 704 | 85 | 619 | 0.317 | 0.204 |
| 800 | 8 | 17 | 7.5 | 392 | — | 113 | 279 | 0.268 | 0.143 |
| Horse manure, | | | | | | | | | |
| 600 | 2 | 17 | 34.5 | — | 458 | 50 | 408 | 0.189 | 0.136 |
| 700 | 2 | 17 | 32.6 | — | 592 | 88 | 504 | 0.246 | 0.163 |
| 800 | 0 | 17 | 28.9 | 479 | — | 142 | 337 | 0.302 | 0.173 |
| 800 | 0 | 48 | 20.7 | 580 | — | 250 | 330 | 0.465 | 0.169 |
| 800 | 1 | 17 | 19.5 | 664 | — | 325 | 339 | 0.591 | 0.174 |
| 800 | 2 | 17 | 13.1 | 682 | — | 405 | 277 | 0.816 | 0.141 |
| 800 | 2 | 48 | 6.3 | 43 | — | 27 | 16 | 0.075 | 0.008 |
| 800 | 8 | 17 | 5.6 | — | — | — | — | — | — |

Factorial analyses allowed interaction effects to be assessed. Micropores were promoted by a combination of both a high O/C ratio and a short time for the activation, or a low O/C ratio and a long time for the activation. These synergisms indicated that the reactions during activation were more rapid for a high O/C ratio than for a low. Significant and negative cross interactions were also observed between the flow rate of $CO_2$ during activation and the time for activation.

tion, which allows large nanoparticles to develop within activated carbons with pore structures with smaller dimension than the nanoparticles. This two-step activation of biomass into activated carbons allows significant magnetic properties to be introduced into the activated carbon. These properties make them highly relevant for water treatment processes and certain gas separation processes. The nanoparticles respond strongly to external magnetic fields and electromagnetic radiation. The textual properties of the activated carbons depended on the type of biomass as well as the process parameters used for activation. Activated HTC horse manure showed a significant amount of mesopores when activated under certain conditions. Activated HTC grass cuttings and activated HTC beer waste were microporous. This difference in pore sizes was rationalized by the degree of condensation in the underlying HTC biomass. HTC grass cuttings and HTC beer waste were highly condensed and similar to lignite in their molecular structure, and HTC horse manure was somewhat less condensed and similar to peat in its molecular structure. It appears as it is possible to tune the degree of microporosity and mesoporosity, not only with process parameters of the activation, but also with the degree of hydrothermal carbonization of the biowaste. These activated carbons can potentially replace such produced from traditional precursors. The overall shape of the solid objects in the activated HTC biomass was largely preserved after both HTC and activation in $CO_2$. The conservation of shapes opens up for a control of the particles of activated carbon by choosing an appropriate biowaste relevant for the application in mind.

The underlying shapes in FIG. S9 show that the biomasses largely remain unaffected by the hydrothermal treatment. In FIG. S10 is shown when comparing (a) with (b), and (c) with (d) that the shapes remain largely unaffected by the activation, but the size of the spheres shrinks. FIG. S11 shows that it seems that there are "bubbles" below the surface which emerge through the surface. There do not seem to be much mesopores on the surface.

Definitions

The term "comprises/comprising" when used in this specification is taken to specify the presence of stated features, integers, steps or components. However, the term does not preclude the presence or addition of one or more additional features, integers, steps or components or groups thereof.

Values are defined as ranges between and including end values.

Thus, the term "between 15 and 50" includes any value from 15 to and including 50 such as 15.5, 20.456 and 50.

The term "autogenic pressure" when used in this specification is taken to specify the pressure increased while the temperature rises in a closed system.

The term "mesopores" when used in this specification is taken to specify the pore size is between 2 nm and 50 nm.

The term "room temperature" when used in this specification is taken to specify a temperature between 15 and 30° C.

The term "bio-sludge" when used in this specification is taken to specify the sediment from the suspension of waste water in a water plant for paper and pulp factory.

The term "carbohydrates" when used in this specification is taken to specify an organic compound consists only of carbon, hydrogen, and oxygen.

The term "alkyl", "alkanol," "alkanon" and "alkylester" when used in this specification is taken to specify a $C_1$ to $C_6$, or $C_1$ to $C_4$ straight or branched alkyl chains, which may comprise functional groups such as hydroxyl, carboxyl, carbonyl, ether, halo, nitrile, formamide, sulfoxide and/or amine groups.

The term "particles" when used in this specification is taken to specify any small localized object to which can be ascribed several physical or chemical properties such as volume or mass.

The term "container" when used in this specification is taken to specify any item used to contain, store, and transport a solid, liquid or gas. Examples may be a pipe or basin.

The term superparamagnetism when used in this specification is taken to specify a form of magnetism that appears in $Fe_3O_4$ (iron(II,III)oxide) nanoparticles smaller than ~30 nm. These are strongly magnetized in the presence of a magnetic field but in the absence of a magnetic field, their average magnetization appears to be zero.

The term ferrimagnetism when used in this specification is taken to specify a form of magnetism that can be found in chemical compounds that have iron(II,III)oxide as their principle component.

The term coercivity when used in this specification is taken to specify the intensity of the applied magnetic field required to reduce the magnetization to zero.

REFERENCES

1. A. B. Fuertes and P. Tartaj, Chem. Mater, 2006, 18, 1675-1679.
2. M. Schwickardi, S. Olejnik, E.-L. Salabas, W. Schmidt, and F. Schüth, Chem. Commun., 2006, 3987-3989.
3. M.-M. Titirici and M. Antonietti, Chem. Soc. Rev., 2010, 39, 103-116.
9. N. Baccile, G. Laurent, F. Babonneau, F. Fayon, M.-M. Titirici, and M. Antonietti, J. Phys. Chem. C, 2009, 113, 9644-9654.
10. N. Baccile, G. Laurent, C. Coelho, F. Babonneau, L. Zhao, and M.-M. Titirici, J. Phys. Chem. C, 2011, 115, 8976-8982.
12. M. Sevilla and A. B. Fuertes, Energy Environ. Sci., 2011, 4, 1765-1771.
13. Z. Liu and F.-S. Zhang, Desalination, 2011, 267, 101-106.
27. B.-O. Erdenetsogt, I. Lee, S. K. Lee, Y.-J. Ko, and D. Bat-Erdene, Int. J. Coal Geol., 2010, 82, 37-44.

The present invention is not limited to the embodiments disclosed but may be varied and modified within the scope of the following claims.

The invention claimed is:

1. A process for preparing magnetic activated carbons comprising the steps of:
   a) treating an aqueous solution comprising a biomass hydrothermally at autogenic pressure at a temperature between 180 and 250° C., under acidic conditions, in the presence of iron ions, to obtain a precursor product, wherein iron ions are encapsulated within the carbon structures, and whereby the biomass is selected from grass cutting, bio waste from fermentation and composting processes, modified carbohydrates, municipal and industrial bio sludge, amino polysaccharides, spilling from ungulates, algae, sea weed, water hyacinth, bagasse, or mixtures thereof, and
   b) activating the precursor product obtained in step a) by mixing an activating agent at elevated temperatures between 550 and 850° C., for a period up to 9 h to obtain magnetic activated carbons,
   wherein the iron content is between 2 and 10 wt. % of the weight of the magnetic activated carbons,
   wherein the magnetic activated carbons have a surface area between 600 and 1000 $m^2/g$.

2. The process according to claim 1, comprising a further step of extracting the hydrothermally carbonized biomass before activation, with an organic solvent selected from an alkanol, alkylester, or alkanone.

3. The process according to claim 1, whereby the activating agent is mixed at elevated temperatures between 700 and 800° C., for a period between 2 and 8 h.

4. The process according to claim 1, whereby the activating agent is a gas or a vapour selected from $CO_2$, dilute $O_2$, inert gas, or mixtures thereof.

5. The process according to claim 4, whereby the flow rate of the gas or vapour is between 5 and 75 dm3/h.

6. The process according to claim 4, whereby the flow rate is between 5 and 75 dm3/h, at atmospheric pressure, per 5 gram of precursor material as obtained in step a).

7. The process according to claim 1, whereby the iron used is an iron salt or alloy comprising $Fe^{2+}$ and/or $Fe^{3+}$.

8. The process according to claim 1, whereby the iron salt is FeSO4.

9. The process according to any one of claims 1 to 8, whereby the amount of iron in the precursor is between 0.5 and 5 wt % of the total weight of the mixture.

* * * * *